US012623745B2

(12) United States Patent
Bouchard et al.

(10) Patent No.: US 12,623,745 B2
(45) Date of Patent: May 12, 2026

(54) ALL-TERRAIN VEHICLE

(71) Applicant: BOMBARDIER RECREATIONAL PRODUCTS INC., Valcourt (CA)

(72) Inventors: Sacha Bouchard, Sherbrooke (CA); Pascal Toupin, Sherbrooke (CA); Simon Filion, Granby (CA); Remi Breton, Drummondville (CA); Marc Schuler, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/275,349

(22) PCT Filed: Feb. 4, 2022

(86) PCT No.: PCT/IB2022/051001
§ 371 (c)(1),
(2) Date: Aug. 1, 2023

(87) PCT Pub. No.: WO2022/168001
PCT Pub. Date: Aug. 11, 2022

(65) Prior Publication Data
US 2024/0083538 A1 Mar. 14, 2024

Related U.S. Application Data

(60) Provisional application No. 63/146,206, filed on Feb. 5, 2021.

(51) Int. Cl.
B62K 5/01 (2013.01)
B60K 13/02 (2006.01)
(Continued)

(52) U.S. Cl.
CPC ............... B62K 5/01 (2013.01); B60K 13/02 (2013.01); B60K 13/04 (2013.01); B62J 37/00 (2013.01); B62J 40/00 (2020.02); B62M 9/08 (2013.01)

(58) Field of Classification Search
CPC .......... B62K 5/01; B62K 11/04; B60K 13/02; B60K 13/04; B60K 2023/0883;
(Continued)

(56) References Cited

U.S. PATENT DOCUMENTS

| | | | | | |
|---|---|---|---|---|---|
| 3,521,904 A | * | 7/1970 | Sheffer | ................... | B62M 7/02 280/270 |
| 4,045,075 A | * | 8/1977 | Pulver | ................... | B62D 21/08 280/798 |

(Continued)

OTHER PUBLICATIONS

International Search Report of PCT/IB2022/051001; Kari Rodriquez; Apr. 15, 2022.

(Continued)

*Primary Examiner* — Timothy Wilhelm
(74) *Attorney, Agent, or Firm* — BCF LLP

(57) ABSTRACT

An all-terrain vehicle (ATV) has a frame having front and rear ends, an internal combustion engine connected to the frame, the engine including a front portion and a rear portion, a single cylinder defining a cylinder axis, an air intake port defined in the front portion facing towards the front end of the frame, and an exhaust port defined in the rear portion facing towards the rear end of the frame. The ATV further has an exhaust assembly fluidly connected to the exhaust port. The exhaust assembly extends from the engine towards the rear end of the frame. The ATV further has a continuously variable transmission operatively connected to the engine, which includes a primary pulley being operatively connected to the engine, a secondary pulley, a drive (Continued)

belt looped around the primary and secondary pulleys, and a housing enclosing the primary pulley, the secondary pulley, and the drive belt.

20 Claims, 17 Drawing Sheets

(51) Int. Cl.
    *B60K 13/04*         (2006.01)
    *B62J 37/00*         (2006.01)
    *B62J 40/00*         (2020.01)
    *B62M 9/08*         (2006.01)

(58) Field of Classification Search
    CPC ...... B60K 17/22; B60K 17/352; B60K 20/02;
                 B62J 37/00; B62J 40/00; B62D 21/183;
                 B62D 65/10; B62M 9/08; B62M 7/06;
                 B62M 9/06; B60Y 2200/124; F02M
                             35/162; F02B 61/02
    See application file for complete search history.

(56) References Cited

U.S. PATENT DOCUMENTS

| | | | | |
|---|---|---|---|---|
| 4,217,970 | A * | 8/1980 | Chika | B62D 31/003 |
| | | | | 296/205 |
| 4,426,101 | A * | 1/1984 | Dyer | B60T 1/06 |
| | | | | 280/124.109 |
| 4,478,105 | A * | 10/1984 | Yamamuro | F16H 47/065 |
| | | | | 192/3.3 |
| 4,641,854 | A * | 2/1987 | Masuda | B60G 7/001 |
| | | | | 180/385 |
| 4,697,665 | A * | 10/1987 | Eastman | F16H 55/56 |
| | | | | 180/311 |
| 4,732,819 | A * | 3/1988 | Komuro | B21C 37/0803 |
| | | | | 280/798 |
| 4,770,262 | A * | 9/1988 | Yasunaga | B62K 5/01 |
| | | | | 180/69.1 |
| 4,786,075 | A * | 11/1988 | Takahashi | B60G 3/24 |
| | | | | 180/254 |
| 4,799,708 | A * | 1/1989 | Handa | B62D 21/183 |
| | | | | 296/205 |
| 4,817,985 | A * | 4/1989 | Enokimoto | B62D 21/183 |
| | | | | 280/788 |
| 5,251,713 | A * | 10/1993 | Enokimoto | B60R 5/003 |
| | | | | 180/68.4 |
| 5,401,056 | A * | 3/1995 | Eastman | B62D 47/006 |
| | | | | 296/193.03 |
| 5,480,001 | A * | 1/1996 | Hara | B62K 11/04 |
| | | | | 180/311 |
| 5,515,940 | A * | 5/1996 | Shichinohe | B60K 17/34 |
| | | | | 74/665 GA |
| 5,527,225 | A * | 6/1996 | Dick | B60K 17/342 |
| | | | | 474/18 |
| 5,845,618 | A * | 12/1998 | Taue | F02B 33/26 |
| | | | | 123/317 |
| 5,975,624 | A * | 11/1999 | Rasidescu | B62D 21/183 |
| | | | | 180/311 |
| 6,142,498 | A * | 11/2000 | Smith | B62K 11/04 |
| | | | | 280/281.1 |
| 6,155,371 | A * | 12/2000 | Izumi | B60K 17/08 |
| | | | | 180/374 |
| 6,170,597 | B1 * | 1/2001 | Fukuda | F16H 37/021 |
| | | | | 474/84 |
| 6,170,841 | B1 * | 1/2001 | Mizuta | B62K 5/08 |
| | | | | 280/271 |
| 6,182,784 | B1 * | 2/2001 | Pestotnik | B60K 23/08 |
| | | | | 180/337 |
| 6,270,106 | B1 * | 8/2001 | Maki | B62K 5/01 |
| | | | | 180/21 |
| 6,454,040 | B1 * | 9/2002 | Fukuda | B60K 11/08 |
| | | | | 180/230 |
| 6,591,934 | B2 * | 7/2003 | Tsutsumikoshi | F02B 75/20 |
| | | | | 180/219 |
| 6,622,806 | B1 | 9/2003 | Matsuura | |
| 6,725,958 | B2 * | 4/2004 | Ashida | F01L 1/024 |
| | | | | 180/9.1 |
| 6,782,963 | B2 * | 8/2004 | Hori | B60K 17/08 |
| | | | | 180/297 |
| 6,796,395 | B1 * | 9/2004 | Berg | B62M 27/02 |
| | | | | 180/186 |
| 6,799,781 | B2 * | 10/2004 | Rasidescu | B62K 5/01 |
| | | | | 280/786 |
| 6,823,956 | B2 * | 11/2004 | Shimizu | F16H 57/0489 |
| | | | | 180/908 |
| 6,896,087 | B2 * | 5/2005 | Korenjak | F02B 61/02 |
| | | | | 180/230 |
| 6,920,949 | B2 * | 7/2005 | Matsuura | B60T 5/00 |
| | | | | 180/908 |
| 7,055,454 | B1 * | 6/2006 | Whiting | B62K 19/40 |
| | | | | 114/364 |
| 7,225,892 | B1 * | 6/2007 | Berthiaume | B62M 7/02 |
| | | | | 180/230 |
| 7,281,603 | B2 * | 10/2007 | Fukuda | F02B 75/16 |
| | | | | 474/46 |
| 7,287,619 | B2 * | 10/2007 | Tanaka | B60K 13/02 |
| | | | | 180/908 |
| 7,306,067 | B2 * | 12/2007 | Yamamoto | B62M 27/02 |
| | | | | 474/94 |
| D579,029 | S * | 10/2008 | Harsh | D15/33 |
| 7,438,153 | B2 * | 10/2008 | Kalsnes | B60K 17/34 |
| | | | | 180/908 |
| 7,537,499 | B2 * | 5/2009 | Davis | B60G 3/20 |
| | | | | 440/12.5 |
| 7,562,736 | B2 * | 7/2009 | Eguchi | F02M 37/0076 |
| | | | | 180/291 |
| 7,650,959 | B2 * | 1/2010 | Kato | B60G 7/02 |
| | | | | 180/311 |
| 7,658,258 | B2 * | 2/2010 | Denney | B62D 21/08 |
| | | | | 180/311 |
| 7,665,566 | B2 * | 2/2010 | Okada | B62D 5/04 |
| | | | | 180/68.1 |
| 7,669,686 | B1 * | 3/2010 | Einboeck | B60T 1/062 |
| | | | | 180/315 |
| 7,713,102 | B2 * | 5/2010 | Longdill | B60F 3/0007 |
| | | | | 440/12.5 |
| 7,758,392 | B2 * | 7/2010 | Gibbs | B60F 3/0069 |
| | | | | 440/12.5 |
| 7,815,002 | B2 * | 10/2010 | Etou | B62M 27/02 |
| | | | | 180/186 |
| 7,845,452 | B2 * | 12/2010 | Bennett | B60B 3/142 |
| | | | | 180/376 |
| 7,849,949 | B2 * | 12/2010 | Arnold | B62K 25/283 |
| | | | | 180/230 |
| 7,905,803 | B2 * | 3/2011 | Mochizuki | F16H 9/18 |
| | | | | 474/18 |
| 7,913,587 | B2 * | 3/2011 | Imura | F02B 61/02 |
| | | | | 74/665 G |
| 7,942,227 | B2 * | 5/2011 | Arnold | B62K 25/283 |
| | | | | 180/231 |
| 7,950,493 | B2 * | 5/2011 | Seki | B62K 5/01 |
| | | | | 180/370 |
| 8,007,005 | B2 * | 8/2011 | Yamashita | B62K 5/01 |
| | | | | 280/786 |
| 8,157,044 | B2 * | 4/2012 | Bennett | B60G 3/20 |
| | | | | 180/291 |
| 8,256,555 | B2 * | 9/2012 | Ackley | B62K 5/027 |
| | | | | 180/311 |
| 8,522,911 | B2 * | 9/2013 | Hurd | B60K 5/1241 |
| | | | | 180/300 |
| 8,746,719 | B2 * | 6/2014 | Safranski | B60G 7/008 |
| | | | | 280/124.152 |
| 8,827,028 | B2 * | 9/2014 | Sunsdahl | B62D 21/183 |
| 8,944,492 | B2 * | 2/2015 | Hufnagl | B62D 23/005 |
| | | | | 296/190.01 |
| 9,073,454 | B2 * | 7/2015 | Shinbori | B60N 3/02 |
| 9,211,914 | B2 * | 12/2015 | Murray | B62D 29/008 |
| 9,376,008 | B2 * | 6/2016 | Abe | B60K 5/1216 |

(56)                References Cited

U.S. PATENT DOCUMENTS

|  |  |  |  |  |
|---|---|---|---|---|
| 9,499,044 | B2 * | 11/2016 | Osaki | F02M 35/0201 |
| 9,587,689 | B2 * | 3/2017 | Pongo | B60K 17/22 |
| 9,944,327 | B2 * | 4/2018 | Hisada | B60K 17/348 |
| 10,214,259 | B2 * | 2/2019 | Taylor | B62J 11/00 |
| 10,563,726 | B2 * | 2/2020 | Bruestle | F02B 75/065 |
| 2004/0035623 | A1 * | 2/2004 | Fecteau | B62K 5/05 |
|  |  |  |  | 180/210 |
| 2004/0195034 | A1 * | 10/2004 | Kato | B60K 17/34 |
|  |  |  |  | 180/312 |
| 2005/0126842 | A1 * | 6/2005 | Rasidescu | B62M 27/02 |
|  |  |  |  | 180/291 |
| 2005/0173918 | A1 * | 8/2005 | Eguchi | B62K 5/01 |
|  |  |  |  | 280/834 |
| 2006/0219457 | A1 * | 10/2006 | Sato | B62J 1/12 |
|  |  |  |  | 180/219 |
| 2006/0254849 | A1 * | 11/2006 | Kalsnes | B60K 17/34 |
|  |  |  |  | 180/292 |
| 2008/0042390 | A1 * | 2/2008 | Geslin | B60G 7/02 |
|  |  |  |  | 280/124.1 |
| 2008/0132376 | A1 * | 6/2008 | Simmons | F16H 3/145 |
|  |  |  |  | 475/298 |
| 2014/0103627 | A1 * | 4/2014 | Deckard | B60R 22/00 |
|  |  |  |  | 411/362 |
| 2014/0262584 | A1 |  | 9/2014 | Lovold et al. |
| 2016/0031492 | A1 * | 2/2016 | Suzuki | B62D 21/183 |
|  |  |  |  | 280/788 |
| 2016/0059896 | A1 * | 3/2016 | Gergaud | B62D 21/06 |
|  |  |  |  | 296/205 |

OTHER PUBLICATIONS

Cannondale, 2002 ATV Onwner's Manual, Cannondale Corp., V2/110101, P/N 951-6001025.
International Preliminary Report on Patentability of application PCT/IB2022/051001 issued from the IPEA/US on Sep. 11, 2023.
dirtwheelsmag.com, Cannondale Quads—History of Amercia's revolutionary performance quad, May 19, 2018, retrieved from https://dirtwheelsmag.com/history-cannondale-quads/ on Nov. 15, 2023.

* cited by examiner

ALL-TERRAIN VEHICLE

CROSS-REFERENCE

The present application claims priority to U.S. Provisional Patent Application No. 63/146,206, filed Feb. 5, 2021, the entirety of which is incorporated herein by reference.

TECHNOLOGICAL FIELD

The present technology relates to all-terrain vehicles.

BACKGROUND

Most off-road vehicle, such as all-terrain vehicles (ATVs) and side-by-side vehicles (SSVs), are powered by an internal combustion engine having a front portion and a rear portion, and an exhaust assembly connected to the front portion of the internal combustion engine and directing the exhaust gases towards the rear of the off-road vehicle.

In such a configuration, a portion of the exhaust assembly extends from the front portion of the internal combustion engine and then along one side of the internal combustion engine toward the rear of the vehicle such that exhaust gases are exhausted behind a driver of the off-road vehicle. On an ATV, since the footrests of the ATV are disposed on either side of the internal combustion engine, the driver may feel some of the heat radiated from the exhaust assembly while operating the ATV, and this heat can make the driver feel uncomfortable. In addition, since a portion of the exhaust assembly extends along one side of the internal combustion engine, a width of the ATV under the straddle seat and between the footrests has to be sufficient to accommodate these components, and may cause some discomfort to the driver.

Thus, there is a desire for an off-road vehicle that could mitigate this issue and improve the comfort of the driver when operating the ATV.

SUMMARY

It is an object of the present technology to ameliorate at least some of the inconveniences present in the prior art.

In one aspect, the present technology provides an all-terrain vehicle (ATV) including a frame having a front end and a rear end defined consistently with a forward travel direction of the all-terrain vehicle. The ATV further has an internal combustion engine connected to the frame. The engine includes a front portion and a rear portion, a single cylinder defining a cylinder axis, an air intake port defined in the front portion facing towards the front end of the frame, and an exhaust port defined in the rear portion facing towards the rear end of the frame. The ATV further includes an exhaust assembly fluidly connected to the exhaust port. The exhaust assembly extends from the engine towards the rear end of the frame. The ATV further has a continuously variable transmission operatively connected to the engine. The continuously variable transmission includes a primary pulley having a rotation axis, the primary pulley being operatively connected to the engine, a secondary pulley having a rotation axis, a drive belt looped around the primary and secondary pulleys, and a housing enclosing the primary pulley, the secondary pulley, and the drive belt. The housing has a top end and a bottom end. The ATV further has a straddle seat connected to the frame. The engine is disposed under the straddle seat. The ATV further has a first footrest disposed on a first side of a longitudinal center plane of the ATV, and a second foot rest disposed on the second side of the longitudinal center plane of the ATV.

In some implementations, the cylinder axis is inclined towards the rear end of the frame by an angle comprised between 30 and 50 degrees relative to a first laterally extending vertical plane.

In some implementations, the cylinder axis passes through the straddle seat.

In some implementations, the ATV further includes an airbox assembly connected to the frame and fluidly connected to the air intake port of the engine. At least a portion of the airbox assembly is disposed in front of the front portion of the engine.

In some implementations, the airbox assembly includes an airbox, and the airbox is disposed entirely longitudinally between the cylinder axis and the front end of the frame.

In some implementations, the exhaust assembly includes an exhaust pipe, and at least one portion of the exhaust pipe is disposed vertically between the top end and the bottom end of the housing of the continuously variable transmission.

In some implementations, at least one portion of the exhaust pipe extends within a circumference of a cylindrical surface defined by a perimeter of the secondary pulley.

In some implementations, the exhaust assembly further includes a muffler, and the muffler is disposed vertically between the cylinder axis and a transmission axis, the transmission axis passing through the rotation axis of the primary pulley and the rotation axis of the secondary pulley.

In some implementations, the transmission axis is angularly displaced from the cylinder axis by an angle comprised between 40 and 50 degrees.

In some implementations, the ATV further includes a driveline operatively connected to the secondary pulley. The driveline includes a drive shaft operatively connected to the engine via the continuously variable transmission, a front propeller shaft operatively connected to the drive shaft and extending towards the front end of the frame, and a rear propeller shaft operatively connected to the drive shaft and extending towards the rear end of the frame.

In some implementations, the driveline further includes a front differential assembly operatively connected to the front propeller shaft, the front differential assembly having a rotation axis, a rear differential assembly operatively connected to the rear propeller shaft, the rear differential assembly having a rotation axis, and a driveline axis passing through the rotation axis of the front differential assembly and the rotation axis of the rear differential assembly. The driveline axis is angularly displaced from the cylinder axis by an angle comprised between 40 to 60 degrees.

In some implementations, the ATV further includes a subtransmission operatively connecting the secondary pulley to the drive shaft.

In some implementations, a second laterally extending vertical plane containing the rotation axis of the secondary pulley intersects the exhaust port of the engine.

In some implementations, a portion of the exhaust port is below a horizontal plane passing through a top end of the secondary pulley.

In some implementations, the first and second footrests are connected to the frame.

In some implementations, the ATV further includes a fuel tank supported by the frame, and the fuel tank is disposed entirely behind the rear portion of the engine.

In some implementations, the continuously variable transmission further includes an air inlet pipe connected to the housing, the air inlet pipe defining an air intake disposed forward of the housing and the engine.

In some implementations, the continuously variable transmission further includes an air outlet pipe connected to the housing, the air outlet pipe defining an air outlet disposed forward of the housing and the engine.

In some implementations, the ATV further includes a plurality of wheels, at least one of the wheels being operatively connected to the internal combustion engine and continuously variable transmission for propelling the all-terrain vehicle, and a steering assembly supported by the frame and operatively connected to at least one of the plurality of wheels to steer the all-terrain vehicle.

For purposes of the present application, terms related to spatial orientation when referring to a vehicle and components in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will first be described with reference to a four-wheeled straddle-seat all-terrain vehicle 20 (hereinafter "ATV") with reference to FIGS. 1 to 14. The technology will also be described with reference to a side-by-side vehicle 300 with reference to FIGS. 15 to 17.

Figure 1:
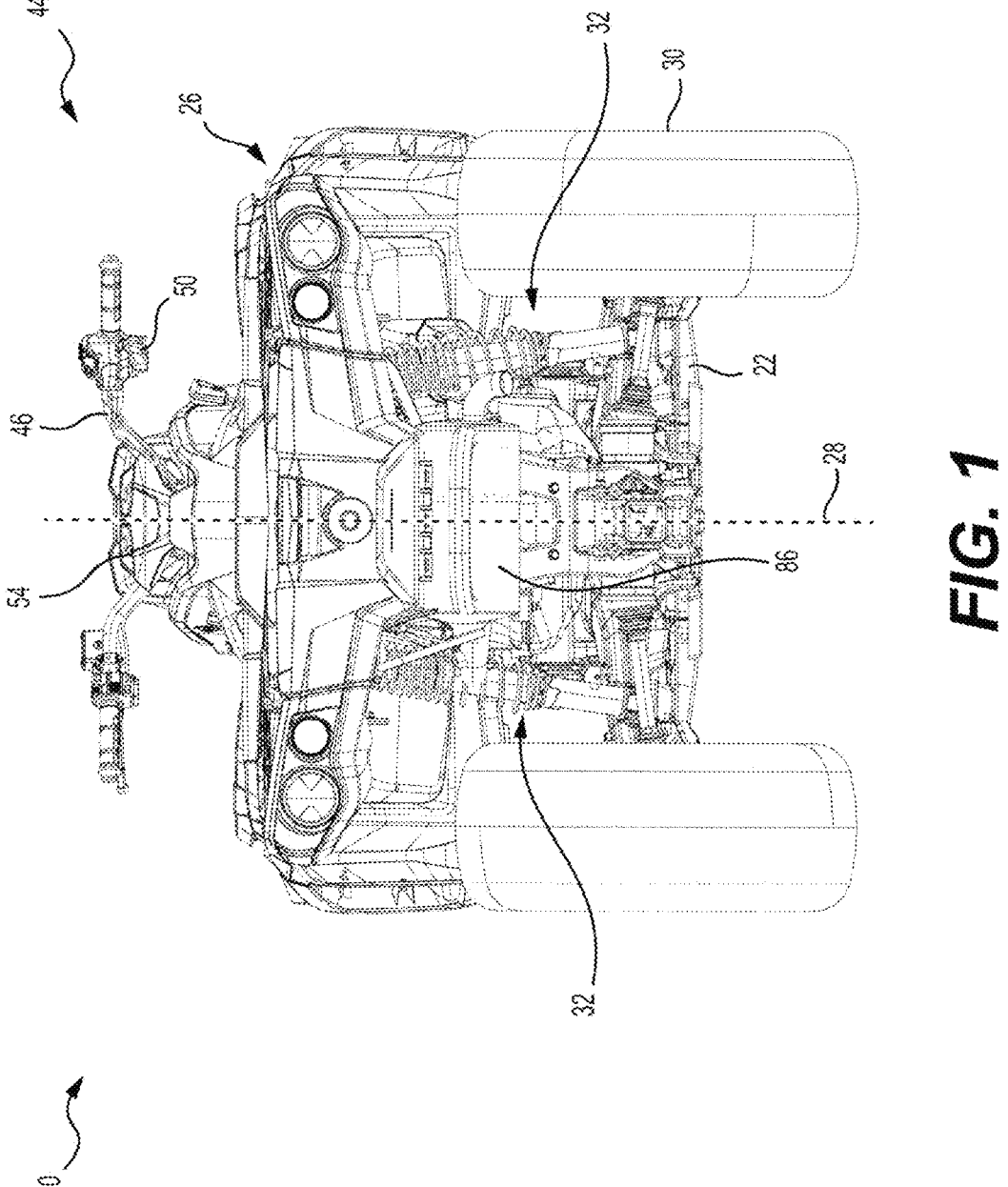
FIG. 1 is a rear view a straddle-seat all-terrain vehicle.
Figure 2:
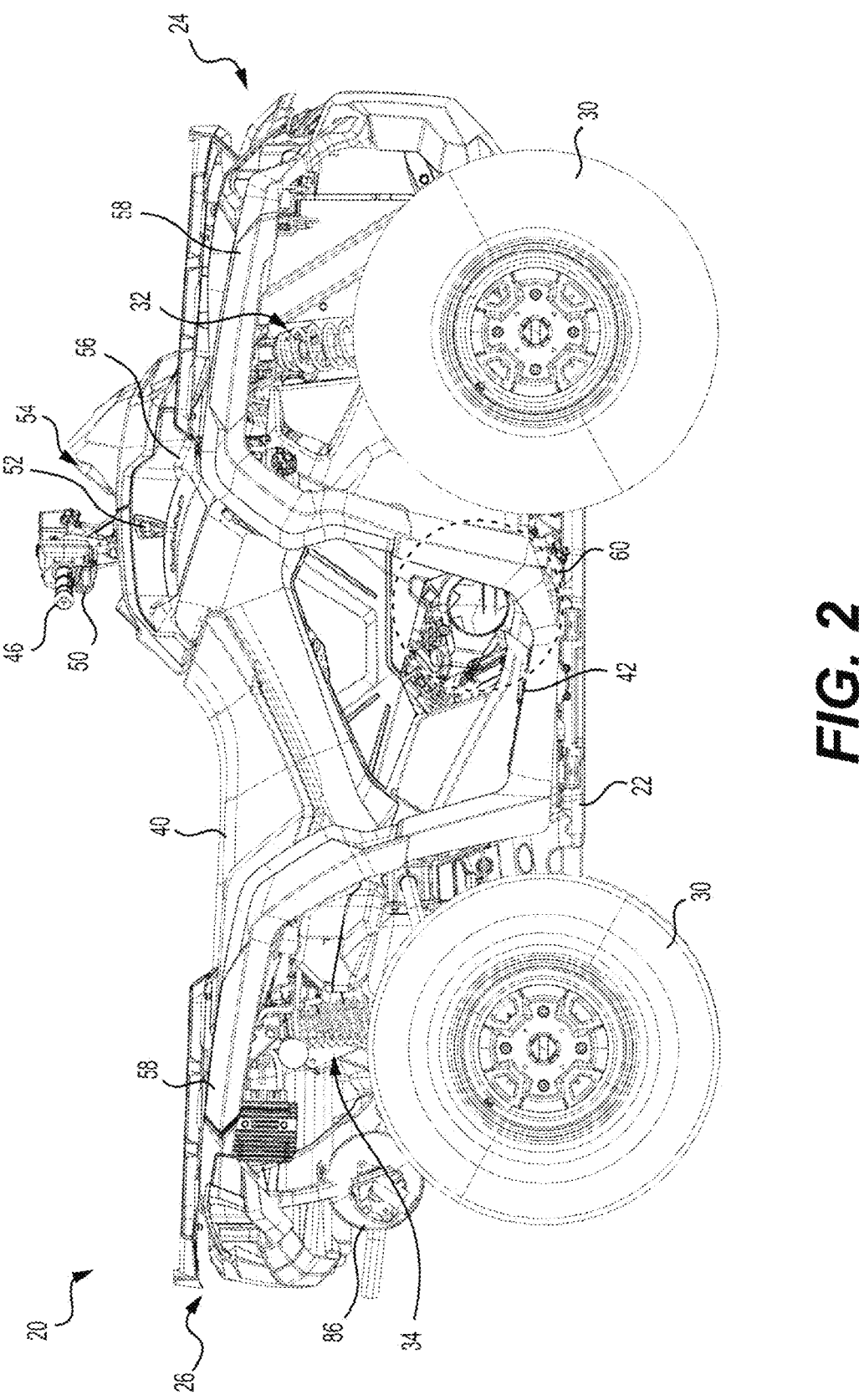
FIG. 2 is a right side elevation view of the vehicle of FIG. 1.
Figure 3:
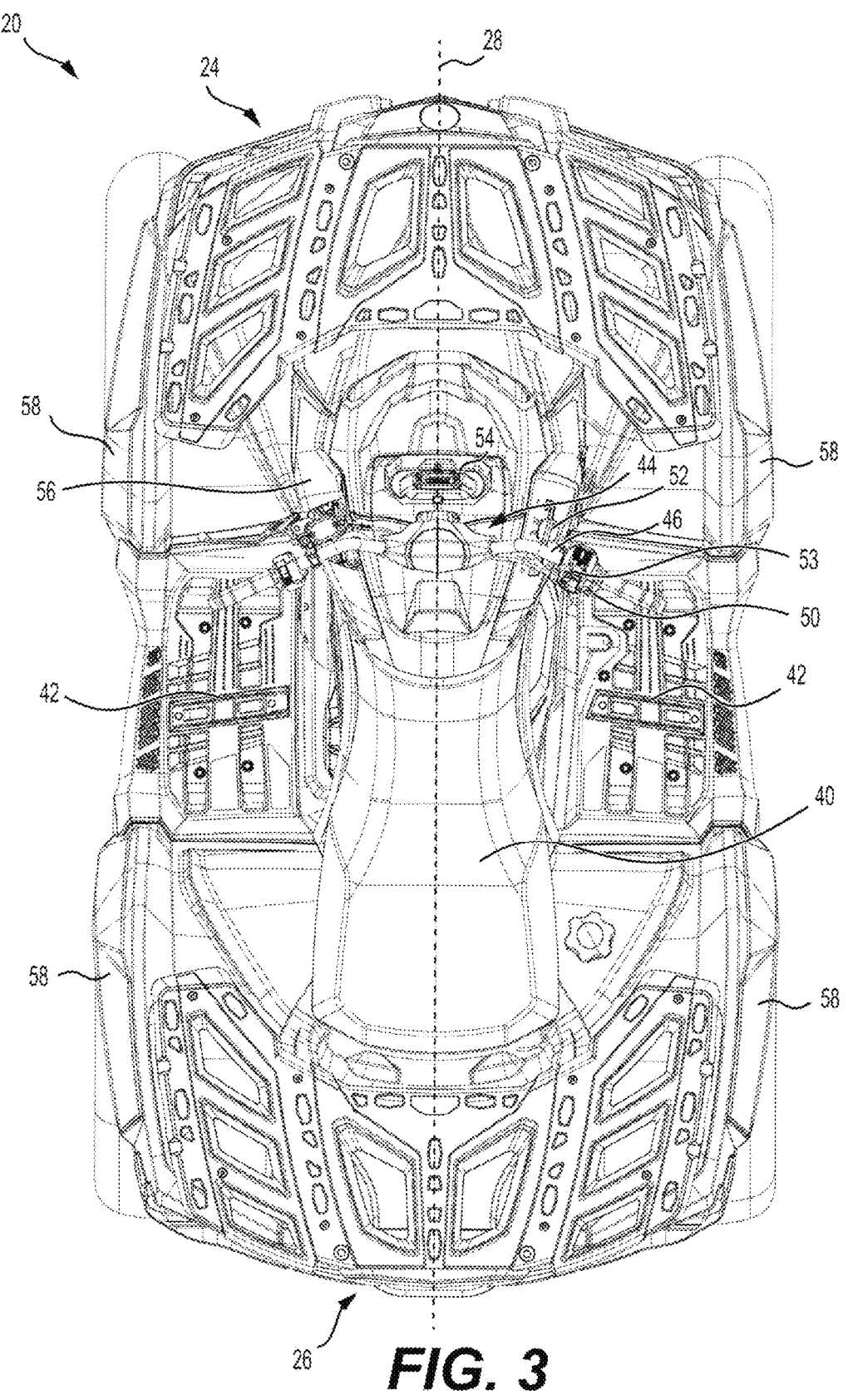
FIG. 3 is a top plan view of the vehicle of FIG. 1.

Referring to FIGS. 1 to 3, the ATV 20 has a frame 22 having a front end 24 and a rear end 26 defined consistently with a forward travel direction of the ATV 20. A longitudinal center plane 28 (FIGS. 1, 3 and 11) extends vertically and longitudinally through the lateral center of the ATV 20. The ATV 20 has two front wheels 30 and two rear wheels 30. Each of the four wheels 30 is provided with low-pressure balloon tires adapted for off-road conditions and traversing rugged terrain. It is contemplated that the ATV 20 could have six wheels 30 or only three wheels 30.

The two front wheels 30 are suspended from the frame 22 by left and right front suspension assemblies 32 while the two rear wheels 30 are suspended from the frame 22 by left and right rear suspension assemblies 34. Each front suspension assembly 32 includes upper and lower A-arms 32a, 32b and a shock absorber assembly 36, best seen in FIGS. 6 and 7. Each rear suspension assembly 34 includes a lower rocker arms 34b and a shock absorber assembly 36, also best seen in FIGS. 6 and 7. A torsion bar 34a is connected to both rocker arms 34b. It is contemplated that other types of front and rear suspension assemblies 32, 34 could be provided.

Referring back to FIGS. 1 to 3, the ATV 20 further includes a straddle seat 40 connected to the frame 22 for accommodating a driver of the ATV 20. An internal combustion engine 60 (schematically illustrated in FIG. 3 but shown in FIGS. 4 to 12) is connected to the frame 22 for powering the ATV 20. The engine 60 is disposed under the straddle seat 40. The wheels 30 are operatively connected to the engine 60 via a continuously variable transmission 100 (hereinafter CVT), a subtransmission 160 and a driveline 170, best seen in FIGS. 6 to 9. The engine 60, the CVT 100, the subtransmission 160 and the driveline 170 will be described in more details below. Driver footrests 42 are provided on either side of the straddle seat 40 and are disposed vertically lower than the straddle seat 40 to support the driver's feet. The footrests 42 are connected to the frame 22. A steering assembly 44 is rotationally connected the frame 22 to enable a driver to steer the ATV 20. The steering assembly 44 includes a handlebar 46 connected to a steering column assembly 48 (FIGS. 6 and 7) for actuating steering linkages 49 (FIGS. 6 and 7) operatively connected to left and right front wheels 30.

A throttle operator 50 (FIGS. 1 to 3), in the form of a thumb-actuated throttle lever, is mounted to the handlebar 46. Other types of throttle operators, such as a finger-actuated throttle lever and a twist grip, are also contemplated. A gear shifter 52 (FIGS. 2, 3 and 6 to 8) located near the handlebar 46 operates the subtransmission 120 and enables the driver to select one of a plurality of gear configurations for operation of the ATV 20. In the illustrated implementation of the ATV 20, the gear configurations include park, neutral, reverse, low, and high. It is contemplated that the sequence and/or number of gear configurations could be different than as shown herein. A driving mode selector button 53 (FIG. 3) also enables the driver to select 2×4 or 4×4 operation of the ATV 20. A display cluster 54, including a number of gauges and buttons, is disposed forwardly of the steering assembly 44.

The ATV 20 also includes fairings 56 extending over the frame 22 of the ATV 20. A fender 58 is disposed over each wheel 30 to protect the driver and/or passenger from dirt, water and other debris being projected by the rotating wheels 30. The fenders 58 also define a portion of the wheel well in which each one of the wheels 30 rotates and, in the case of the front wheels 30, steers.

The ATV 20 further includes other components such as brakes, a radiator, headlights, and the like. As it is believed that these components would be readily recognized by one of ordinary skill in the art, further explanation and description of these components will not be provided herein.

Figure 4:
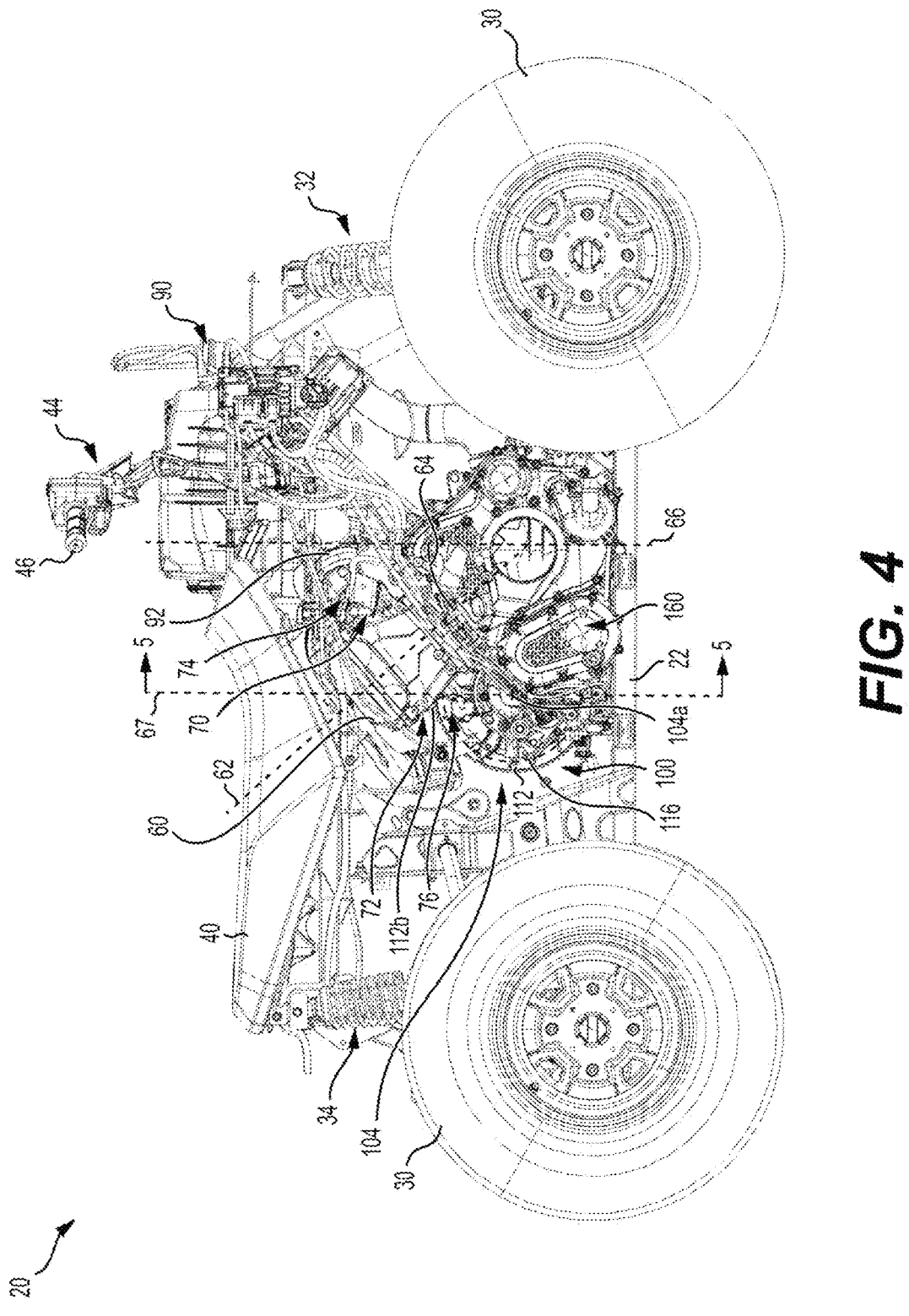
FIG. 4 is a right side elevation view of the frame, engine, continuously variable transmission, airbox assembly, wheels, seat, steering assembly and front and rear suspension assemblies of the vehicle of FIG. 1.
Figure 5:
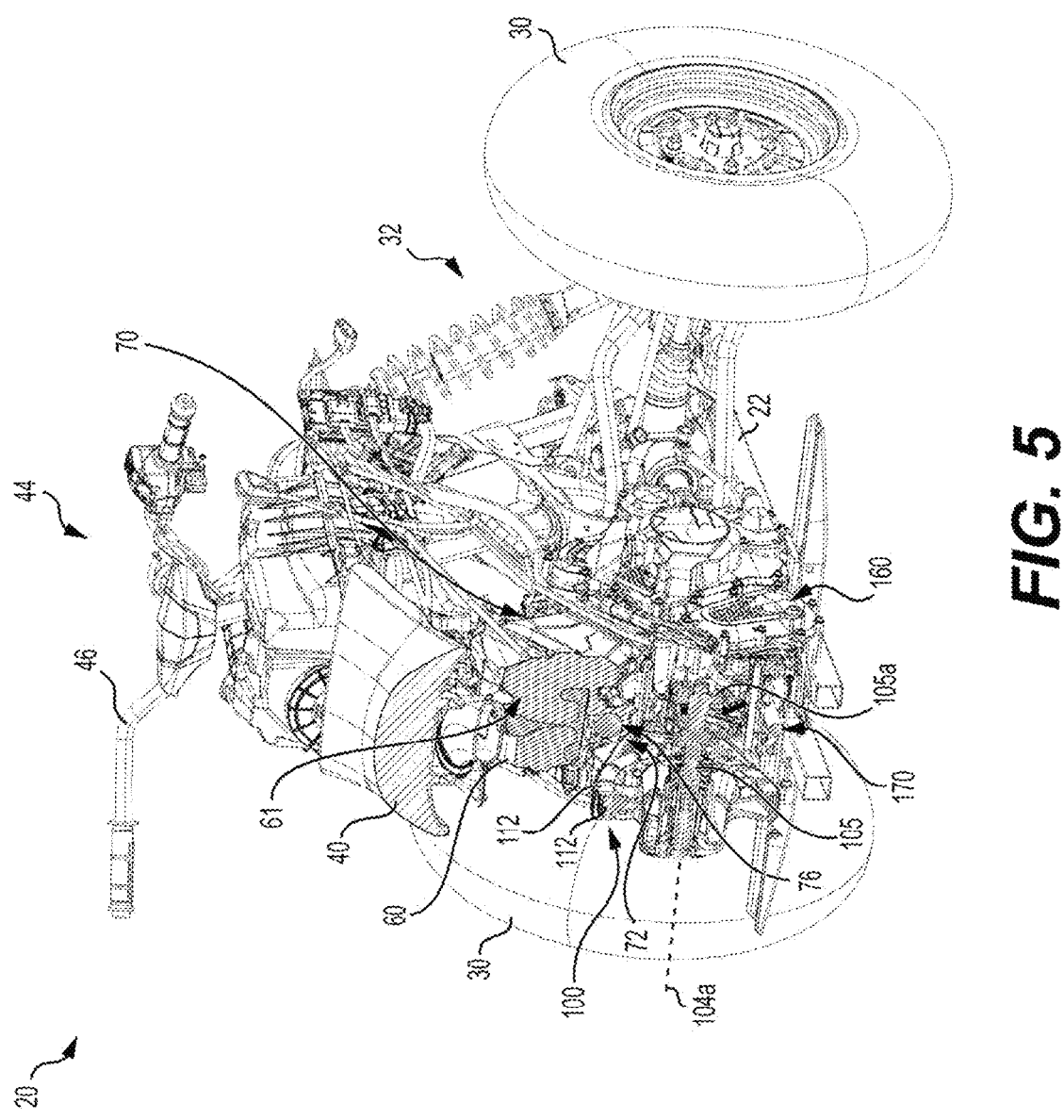
FIG. 5 is a cross-sectional, perspective view taken from a rear, right side of the components of the vehicle shown in FIG. 4 taken along cross-section plane 5-5 of FIG. 4.
Figure 6:
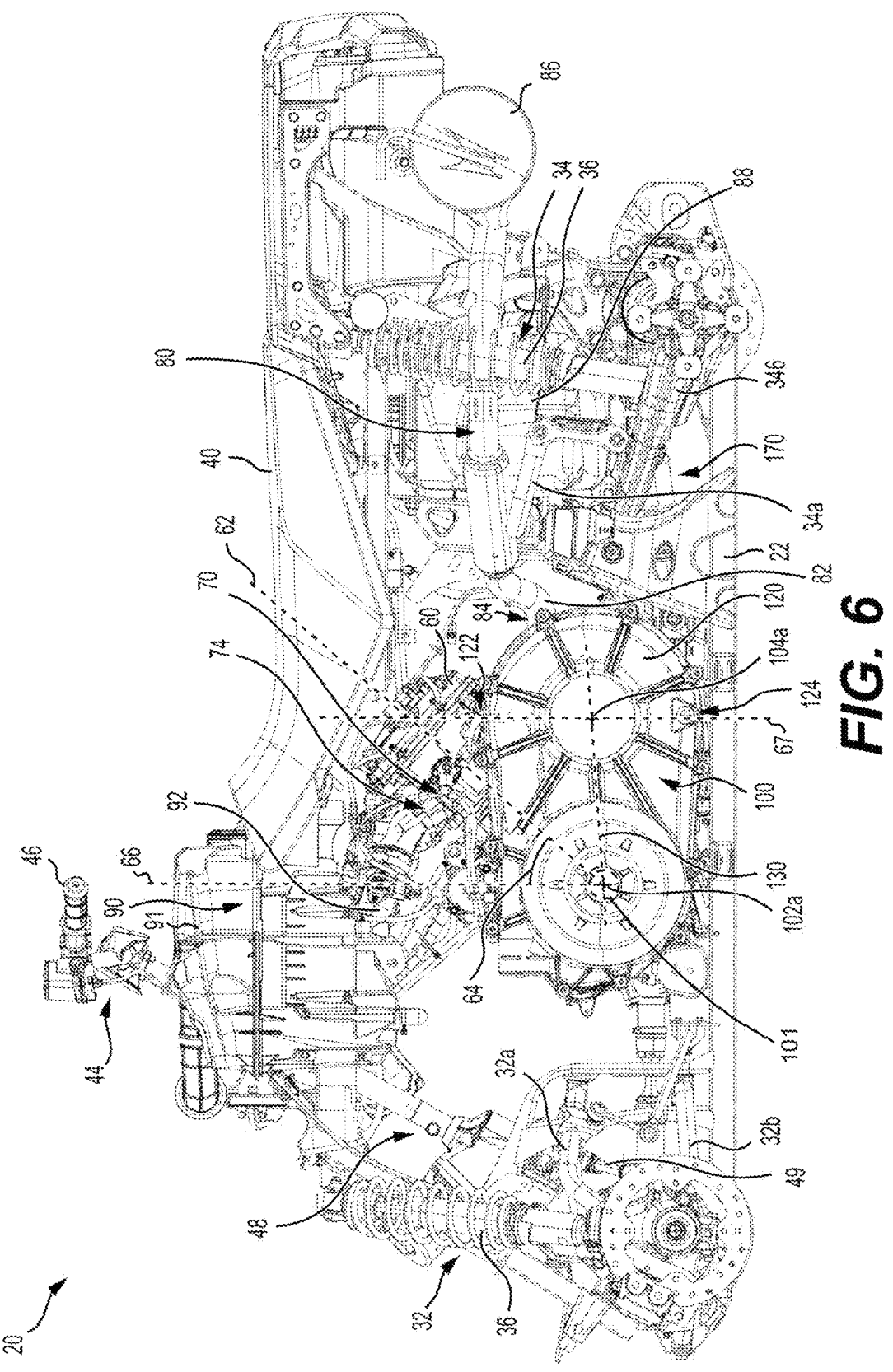
FIG. 6 is a left side elevation view of the frame, engine, continuously variable transmission, airbox assembly, driveline, exhaust assembly, seat, fuel tank, steering assembly and front and rear suspension assemblies of the vehicle of FIG. 1.
Figure 7:
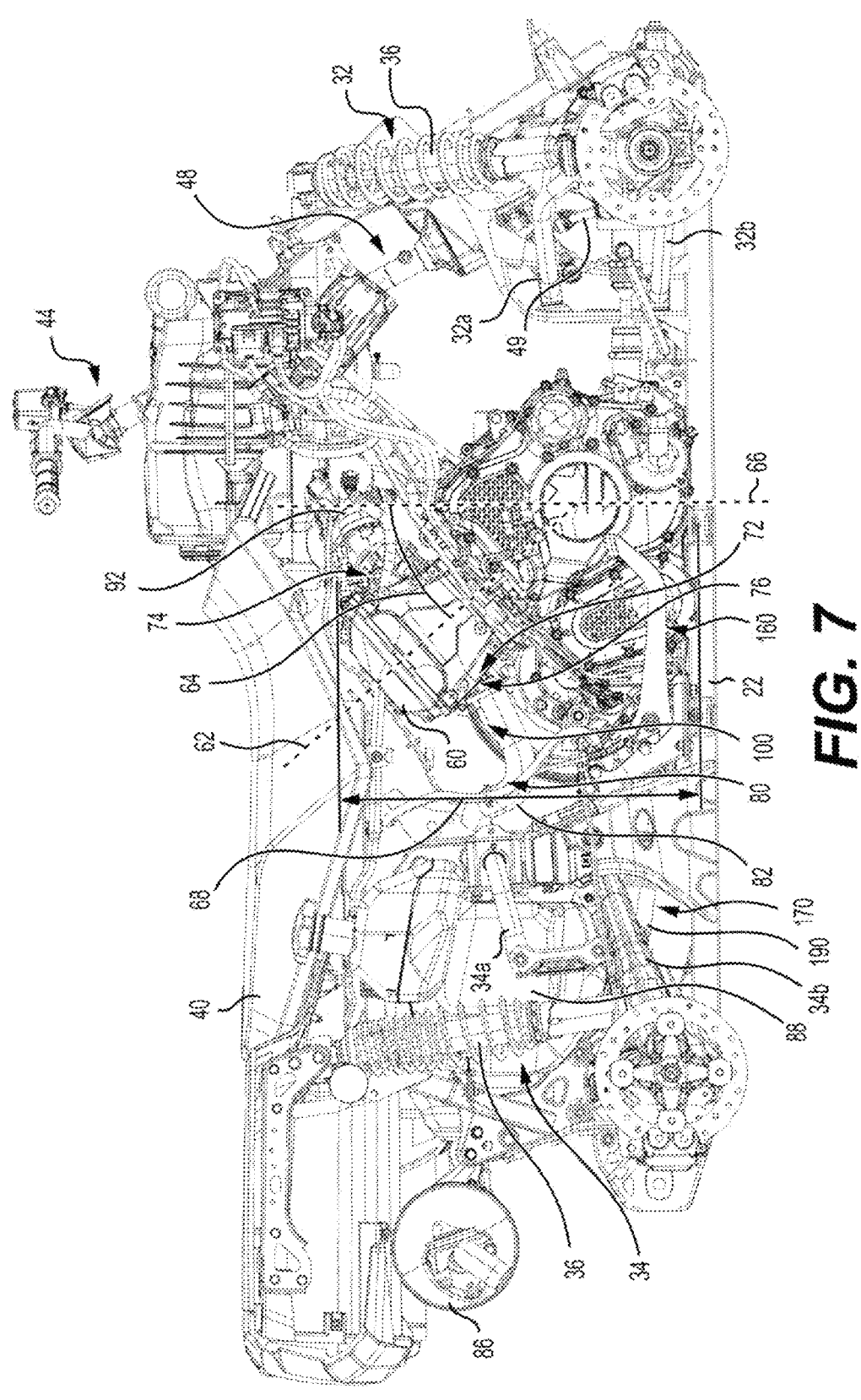
FIG. 7 is a right side elevation view of the components of the vehicle shown in FIG. 6.

Referring now to FIGS. 4 to 7, the engine 60 will be described in more details. The engine 60 is a mono-cylinder internal combustion engine. The engine 60 thus has a single cylinder 61 (FIG. 5) defining a cylinder axis 62 (FIGS. 6 to 10). The cylinder axis 62 extends in the center of the cylinder 61 of the internal combustion engine 60. Thus, the piston (not shown) reciprocates along the cylinder axis 62 when the engine 60 is in operation. The engine 60 is connected to the frame 22 and is disposed such that the cylinder axis 62 is inclined towards the rear end 26 of the frame 22 by an angle 64 of about 40 degrees relative to a laterally extending vertical plane 66 (FIGS. 4 and 7). In other words, the vertical plane 66 is perpendicular to longitudinal center plane 28 and extends laterally across the ATV 20. It is contemplated that, in other implementations, the angle 64 could range between 30 and 50 degrees relative to the vertical plane 66.

In the present implementation, the cylinder axis 62 passes through the straddle seat 40. With the engine 60 positioned in such a manner, an effective height 68 (FIG. 7) of the engine 60 (i.e. the height between its top end and its bottom end) is reduced compared to ATVs having a mono-cylinder internal combustion engine positioned such that the cylinder axis 62 extends at a more acute angle 64, i.e. with the cylinder axis 62 being more upright than in the present implementation. This positioning of the engine 60 allows the straddle seat 40 to be connected to the frame 20 at a lower position than if the cylinder axis 62 was more upright, which facilitates access to the straddle seat 40 while lowering the center of gravity of the ATV 20.

Still referring to FIGS. 4 to 7, the engine 60 has a front portion 70 and a rear portion 72. The engine 60 has an air intake port 74 defined in the front portion 70 thereof. The air intake port 74 faces towards the front end 24 of the frame 22 and upward. The engine 60 further has an exhaust port 76 defined in the rear portion 72 thereof. The exhaust port 76 faces towards the rear end 26 of the frame 22 and downward.

Figure 11:
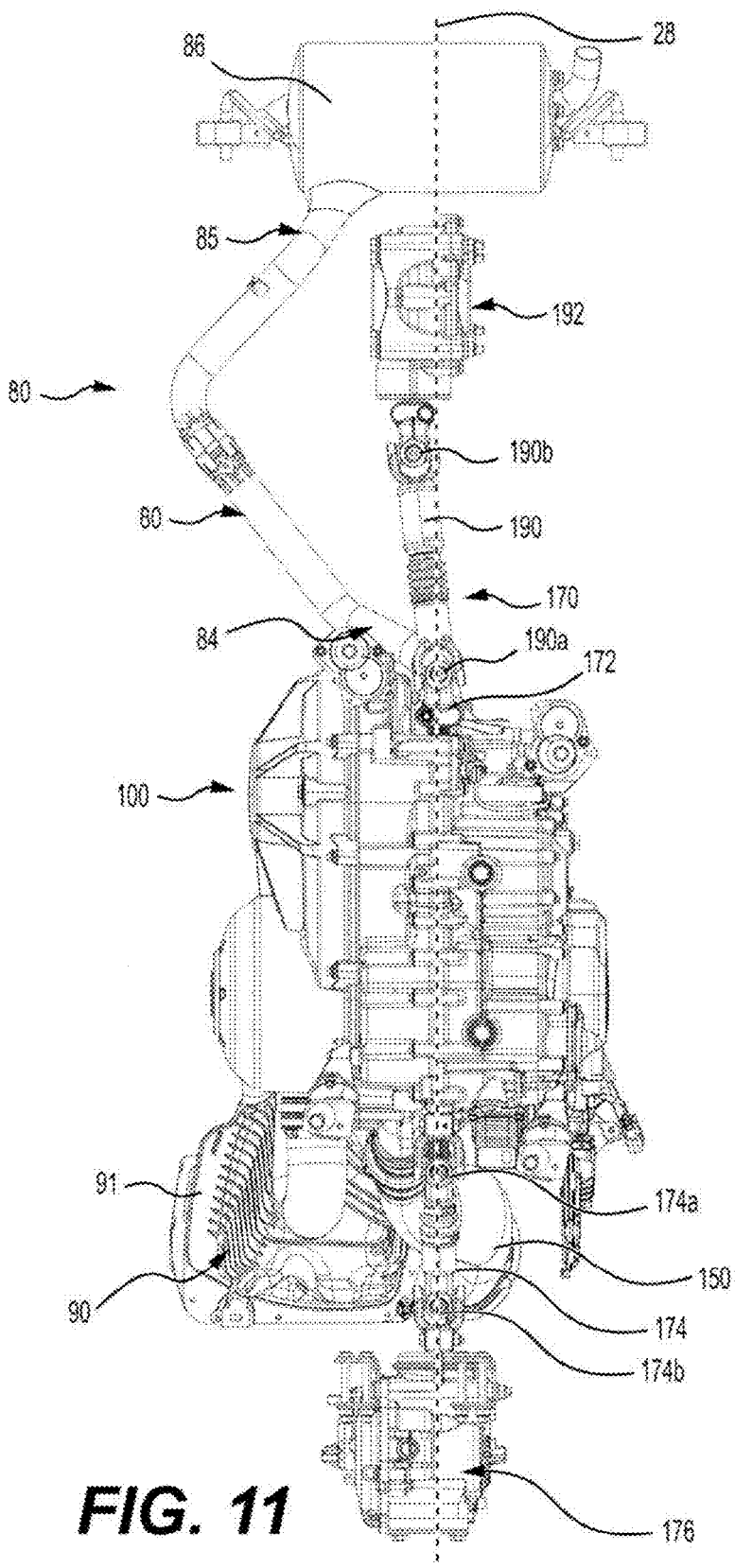
FIG. 11 is a bottom plan view of the components of the vehicle shown in FIG. 8.

Referring to FIGS. 6 to 8, 11 and 12, an exhaust assembly 80 is connected to the frame 22. The exhaust assembly 80 includes an exhaust pipe 82 and a muffler 86. The exhaust pipe 82 has a forward portion 84 that is connected to the exhaust port 76, and a rearward portion 85 that is connected to the muffler 86. The exhaust pipe 82 thus extends from the engine 60 towards the rear end 26 of the frame 22. Since the exhaust pipe 82 extends from the rear portion 72 of the engine 60 towards the rear end 26 of the frame 22, the exhaust pipe 82 does not extend along the left or right side of the engine 60. As best seen in FIG. 11, the forward portion 84 of the exhaust pipe 82 extends near the longitudinal center plane 28 of the ATV 20, and thus provides a narrower packaging of the engine 60 and exhaust assembly 80 than if the exhaust pipe 82 extended along a side of the engine 60. Such a narrower packaging may improve the comfort of the driver (and passenger in certain vehicles) sitting on the seat 40 of the ATV 20. Furthermore, since the exhaust pipe 82 does not extend on one side of the engine 60, and thus between one of the driver's legs and the engine 60, the comfort of the driver is improved since less heat is radiated from the exhaust pipe 82 to one of the driver's legs compared to ATVs where the driver has one leg proximate to the exhaust pipe. Moreover, since the exhaust pipe 82 does not have a portion extending along one side of the engine 60, the exhaust path provided by the exhaust assembly 80 of the ATV 20 is shorter than if the exhaust pipe 82 extended along a side of the engine 60.

Referring to FIGS. 6 and 7, the ATV 20 further includes a fuel tank 88. The fuel tank 88 is supported by the frame 22. The fuel tank 88 is disposed entirely behind the rear portion 72 of the engine 60. In addition, the fuel tank 88 is disposed below the straddle seat 40. The fuel tank 88 could be disposed otherwise in other implementations.

Figure 10:
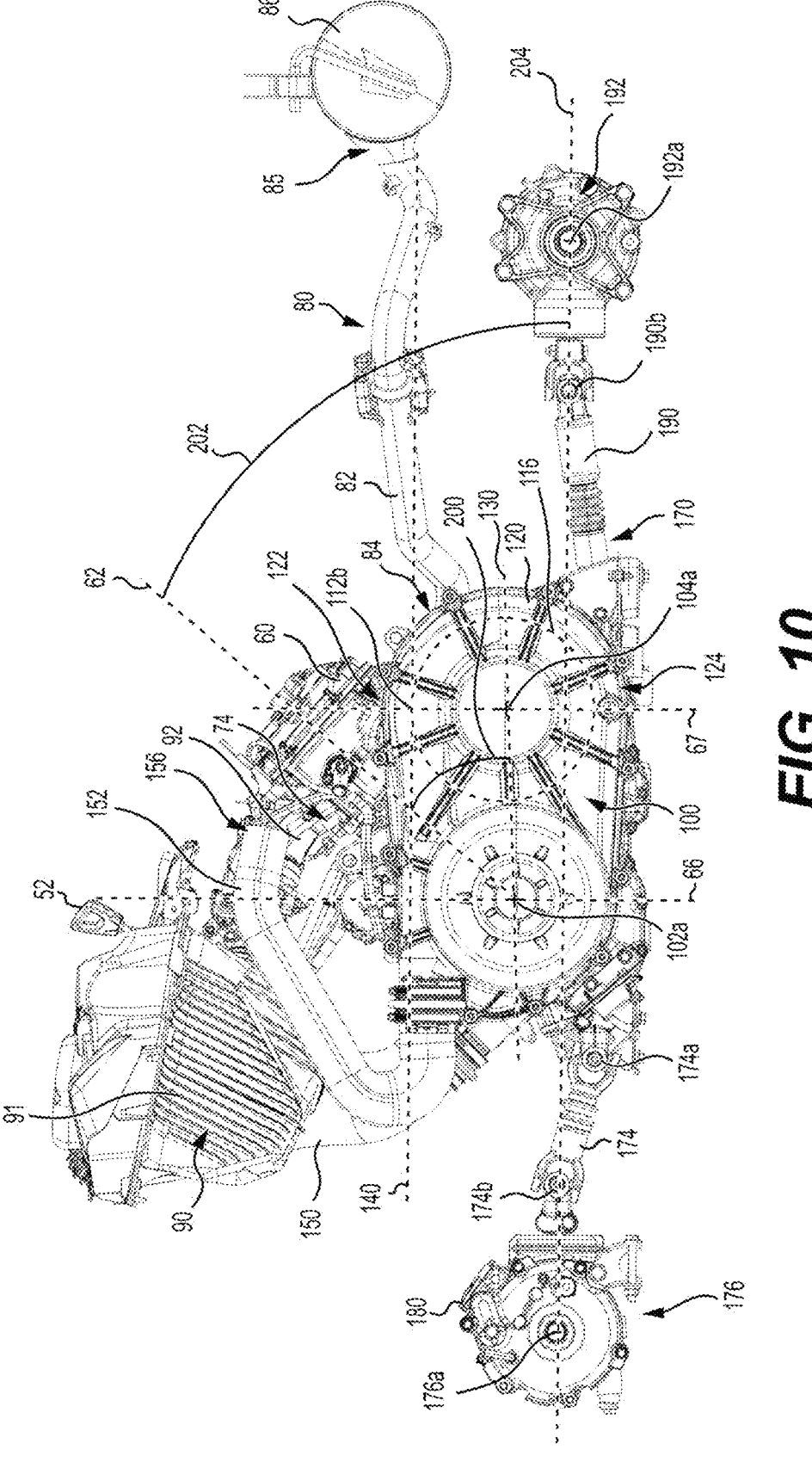
FIG. 10 is a left side elevation view of the components of the vehicle shown in FIG. 8.
Figure 12:
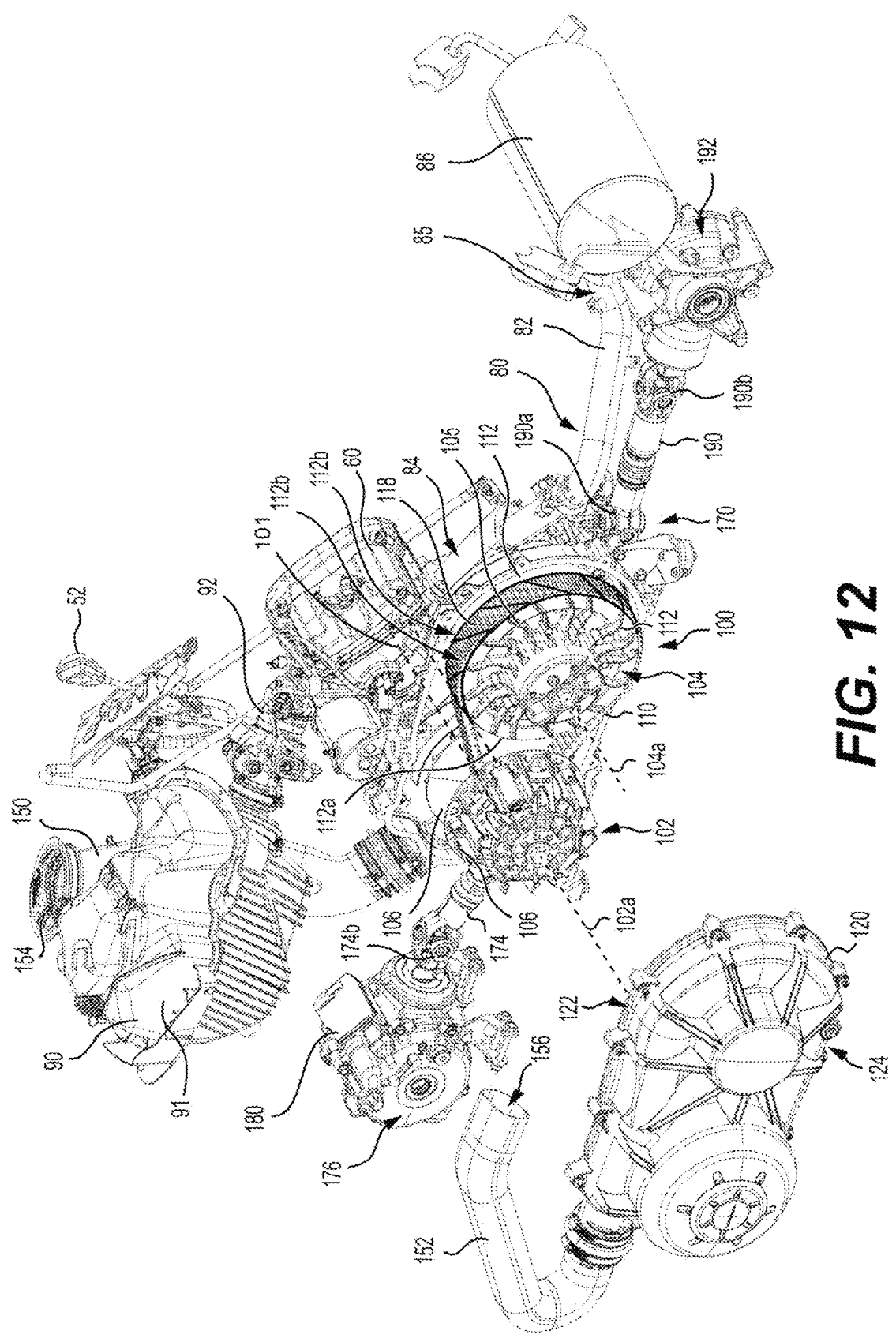
FIG. 12 is a partially exploded, perspective view taken from a left, top, rear side of the components of the vehicle shown in FIG. 8.
Figure 13:
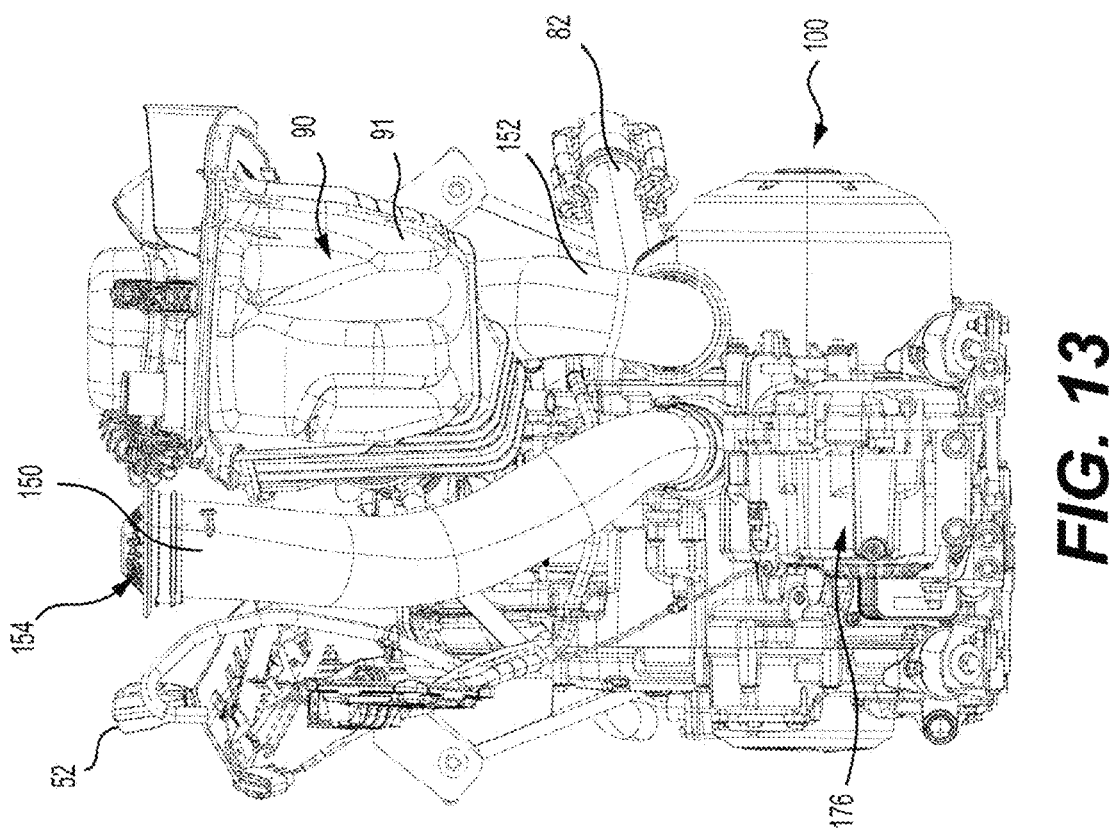
FIG. 13 is a front elevation view of the components of the vehicle shown in FIG. 8.
Figure 14:
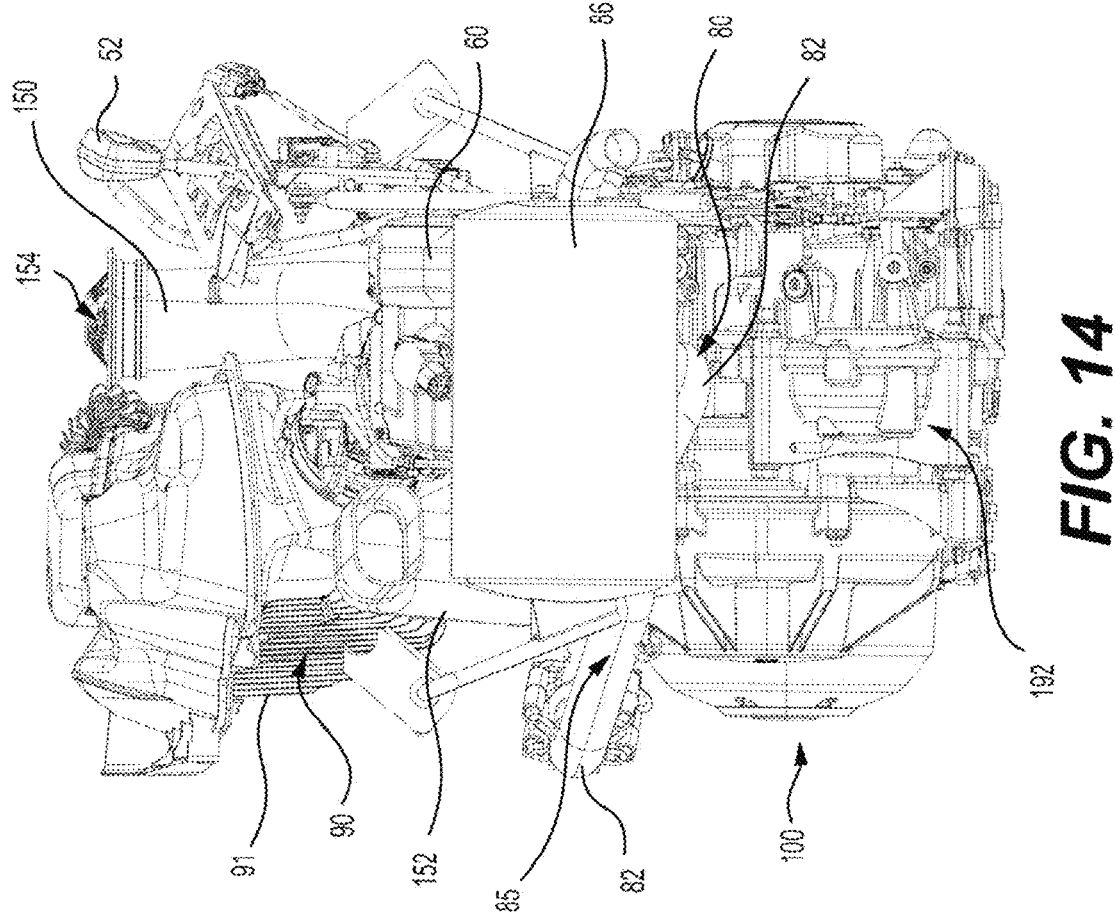
FIG. 14 is a rear elevation view of the components of the vehicle shown in FIG. 8.

Referring to FIGS. 10 to 12, the ATV 20 further has an airbox assembly 90. The airbox assembly 90 is connected to the frame 22. The airbox assembly 90 includes an airbox 91 and air intake conduit 92 (best seen in FIG. 12) that is fluidly connected to the air intake port 74 of the engine 60. Since the air intake port 74 of the engine 60 is defined in the front portion 70 of the engine 60 and faces towards the front end 24 of the frame 22, the air intake conduit 92 extends from the front portion 70 of the engine 60 towards the front end 24 of the frame 22. The airbox assembly 90 is disposed entirely in front of the front portion 70 of the engine 60. In other implementations, only a portion of the airbox assembly 90 could be disposed in front of the front portion 70 of the engine 60, with another portion being disposed above the engine 60, for example. Having the airbox assembly 90 disposed generally in front of the engine 60 is advantageous because, as dirt is often lifted up in the air when the ATV 20 travels forward, the air that enters the airbox assembly 90 is generally cleaner than air that would enter the airbox assembly should it be disposed further back in a conventional ATV. However, to ensure that clean air enters the engine 60 via the air intake port 74, the airbox assembly 90 includes a filter (not shown). In addition, the airbox 91 is disposed entirely longitudinally between the cylinder axis 62 and the front end 24 of the frame 22, as best seen in FIG. 6.

Referring back to FIGS. 4 to 6, the CVT 100 will be described in more details. The CVT 100 is connected to the frame 22 and is operatively connected to the engine 60. The engine 60 drives a crankshaft 101 (schematically illustrated in dotted lines in FIGS. 6 and 12) that rotates about a horizontally disposed axis that extends generally transversely to the longitudinal center plane 28 of the ATV 20. The crankshaft 101 drives the CVT 100 for transmitting torque to the wheels 30 for propulsion of the ATV 20. The CVT 100 includes a primary pulley 102 (FIG. 12) coupled to the crankshaft 101 to rotate with the crankshaft 101 of the engine 60 and a secondary pulley 104 (FIG. 12) coupled to one end of a transversely mounted jackshaft 105 (FIG. 5) that is supported in a subtransmission 160 through bearings. The primary pulley 102 rotates about a rotation axis 102*a* and the secondary pulley 104 rotates about a rotation axis 104*a* (FIG. 6). The opposite end of the transversely mounted jackshaft 105 is connected to the input member 105*a* of the subtransmission 160, and the output member (not shown) of the subtransmission 160 is connected to the driveline 170 for forming a driving connection with the wheels 30. Thus, the subtransmission operatively connects the secondary pulley 104 to the driveline 170. In other implementations, it is contemplated that the primary pulley 102 could be coupled to a shaft other than the crankshaft 101 of the engine 60, such as an output shaft, a counterbalance shaft, or a power take-off shaft driven by the engine 60.

Referring to FIGS. 4 and 5, it can be seen that a laterally extending vertical plane 67 intersecting the jackshaft 105 and containing the rotation axis 104*a* of the secondary pulley 104 intersects the exhaust port 76 of the engine 60. The vertical plane 67 is also perpendicular to the longitudinal center plane 28, and parallel to the vertical plane 66. The vertical plane 67 is disposed at the rear of the plane 66, as shown in FIG. 4.

Referring to FIG. 12, the primary pulley 102 of the CVT 40 includes a pair of opposed frustoconical belt drive sheaves 106 between which a drive belt 110 is located. The drive belt 110 is made of rubber, but it is contemplated that it could be made of metal linkages or of a polymer. The secondary pulley 104 includes a pair of frustoconical belt drive sheaves 112 between which the drive belt 110 is located. The drive belt 110 is looped around both the primary pulley 102 and the secondary pulley 104. The torque (or rotational efforts) being transmitted to the secondary pulley 104 provides the necessary clamping force on the drive belt 110 through its torque sensitive mechanical device in order to efficiently transfer torque to the other powertrain components.

Referring to FIGS. 4, 10 and 12, the secondary pulley 104 defines a circumference 116 (shown in dashed line in FIGS. 4 and 10) of a cylindrical surface 118 (FIG. 12) defined by a perimeter 112*a* of the drive sheaves 112. Only a portion of the cylindrical surface 118 is shown in FIG. 12 with hatching. The perimeter 112*a* is defined at an outermost portion of the drive sheaves 112 relative to the rotation axis 104*a*. The drive sheaves 112 also have atop end 112*b*, which is located on the perimeter 112*a*. As best seen in FIGS. 10 and 12, the forward portion 84 of the exhaust pipe 80 extends within the circumference 116 of the cylindrical surface 118.

The CVT 100 further includes a housing 120 enclosing the primary pulley 102 and the secondary pulley 104. The housing 120 has a top end 122 and a bottom end 124, best seen in FIGS. 6 and 10. As best seen in FIG. 6, the forward portion 84 of the exhaust pipe 80 is disposed vertically between the top end 122 and the bottom end 124 of the housing 120. Furthermore, the CVT 100 defines a transmission axis 130 (FIGS. 6 and 10) which is an imaginary line passing through the rotation axes 102*a*, 104*a* and extending parallel to the longitudinal center plane 28. As best seen in FIG. 10, the muffler 86 is disposed vertically between the cylinder axis 62 and the transmission axis 130. It is contemplated that the muffler 86 could be disposed otherwise in other implementations.

Figure 8:
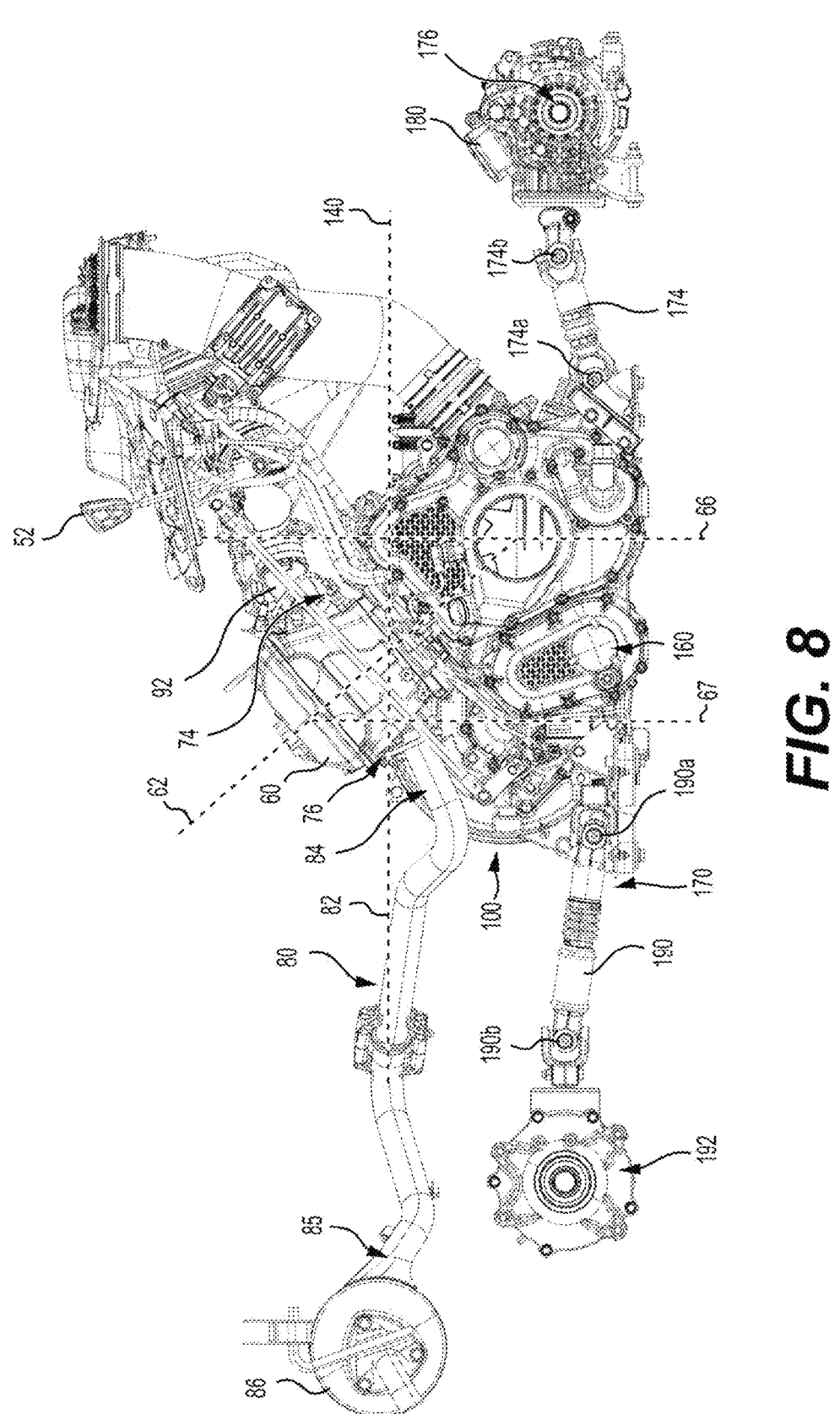
FIG. 8 is a right side elevation view of the engine, continuously variable transmission, airbox assembly, driveline and exhaust assembly of the vehicle of FIG. 1.

Referring to FIGS. 8 and 10, there is shown a horizontal plane 140 extending parallel to a flat, level ground surface on which the ATV 20 the disposed. The horizontal plane 140 extends perpendicular to the longitudinal center plane 28, and the vertical planes 66, 67. The horizontal plane 140 passes through the top end 112*b* of the drive sheaves 112 of the secondary pulley 104. The horizontal plane 140 extends above a portion of the exhaust port 76 of the engine 60. It is contemplated that the exhaust port 76 and/or the horizontal plane 140 could be disposed otherwise in other implementations.

Figure 9:
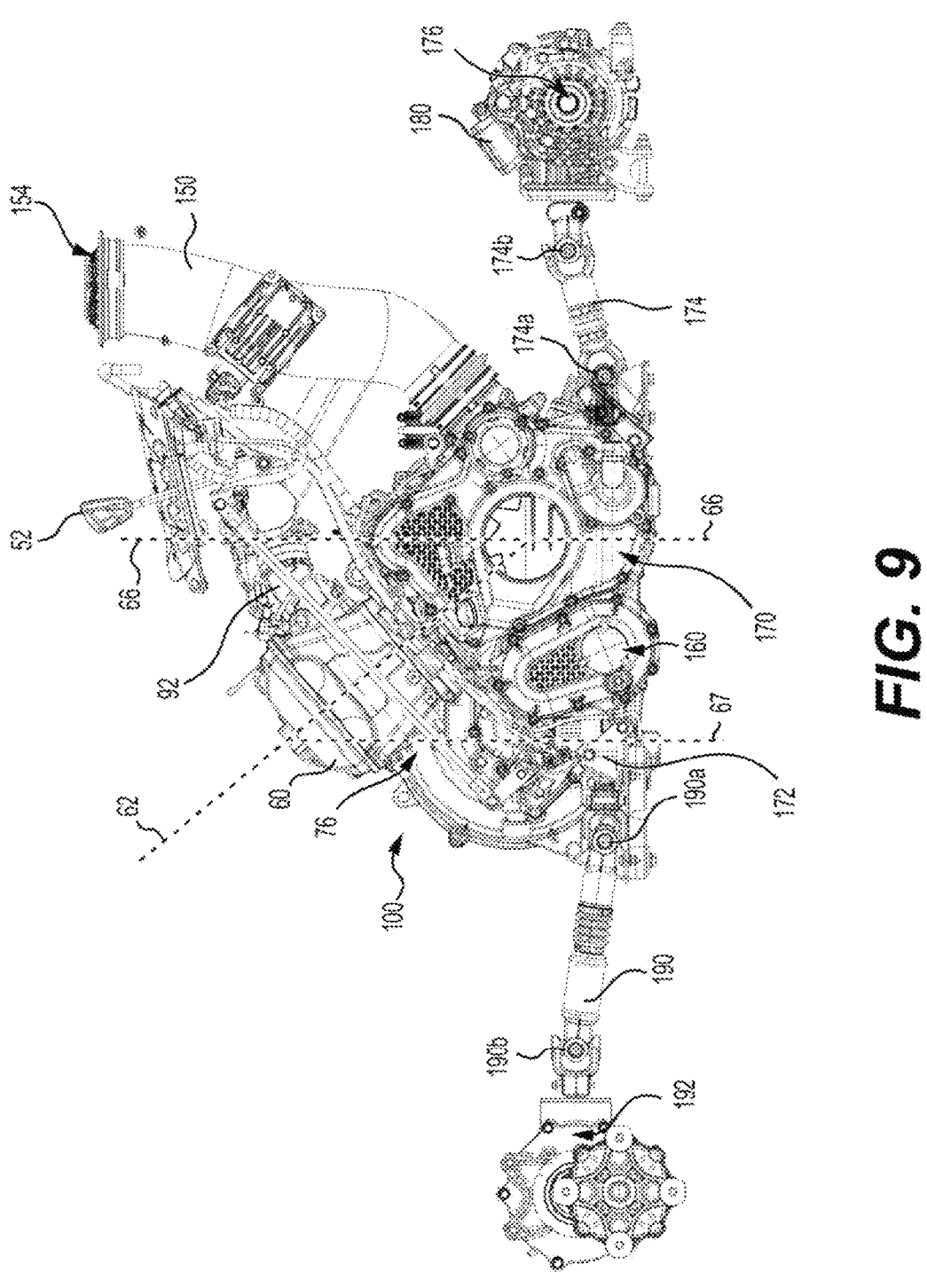
FIG. 9 is a right side elevation view of the components of the vehicle shown in FIG. 8, with the exhaust assembly and an airbox removed and the drive shaft of the driveline shown in phantom lines.

Referring to FIGS. 9 to 12, the CVT 100 further has an air inlet pipe 150 and an air outlet pipe 152 connected to the housing 120. The air inlet pipe 150 allows fresh air to enter the housing 120 and cool the primary pulley 102 and the drive belt 110. The air outlet pipe 152 allows warm air to exit the housing 120. Ridges 105 projecting from the sheaves 112 act as fan blades to enhance air circulation and facilitate heat exchange between the components of the CVT 100 and the fresh air drawn in the housing 120 via the air inlet pipe 150. As best seen in FIGS. 8 to 10, the air inlet pipe 150 defines an air intake 154 and the air outlet pipe 152 defines an air outlet 156. The air intake 154 and the air outlet 156 extend forward and upwardly from the housing 120, and forward of the engine 60. Moreover, the air intake 154 is disposed forward and above of the gear shifter 52. This positioning allows egress of fresh air that is, under at least some circumstances, cleaner than air that would enter the air inlet pipe 150 should it be disposed further back.

Referring to FIGS. 7 to 10, the subtransmission 160 and the driveline 170 of the ATV 20 will be described. As described above, the output member (not shown) of the subtransmission 160 is connected to the driveline 170 for forming a driving connection with the wheels 30. The subtransmission 160 is operatively connected to the gear shifter 52 and permits the driver to select different driving configurations including park, neutral, reverse, low, and drive.

The driveline 170 includes a drive shaft 172 (shown in phantom lines in FIG. 9) which extends to the right of the primary and secondary pulleys 102, 104, and parallel to the longitudinal center plane 28. The drive shaft 172 extends horizontally, and passes through the vertical plane 66 and the vertical plane 67, as best seen in FIG. 9. The drive shaft 172 is operatively connected to a front propeller shaft 174 via a universal joint 174*a*. The front propeller shaft 174 extends from the drive shaft 172 towards the front end 24 of the frame 22. The front propeller shaft 174 is in turn operatively connected to a front differential assembly 176 via another universal joint 174*b*. The front differential assembly 176 is intersected by the longitudinal center plane 28, as best seen in FIG. 11. The front differential assembly 176 is operatively connected to the front wheels 30 via front wheel axle assemblies (not shown). The front differential assembly 176 defines a rotation axis 176*a* (shown as a "+" sign in FIG. 10) of the front wheel axle assemblies. The front differential assembly 176 includes an electronic selector 180 operatively connected to the driving mode selector button 53. The selector 180 allows to selectively connect the front propeller shaft 174 to the front wheel axle assemblies to enable 4×4 driving mode of the ATV 20, or to selectively disconnect the front propeller shaft 174 from the front wheel axle assemblies to enable 2×4 driving mode of the ATV (i.e. with only the rear wheels 30 propelling the ATV 20).

Referring to FIGS. 8 to 12, the driveline 170 further includes a rear propeller shaft 190. The drive shaft 172 and the rear propeller shaft 190 are operatively connected via a universal joint 190*a*. The rear propeller shaft 190 extends from the drive shaft 172 towards the rear end 26 of the frame 22. The rear propeller shaft 190 is operatively connected to a rear differential assembly 192 via another universal joint 190*b*. Although it can be seen in FIG. 11 that the rear propeller shaft 190 is skewed relative to the drive shaft 172, the longitudinal center plane 28 also intersects the rear differential assembly 192. The rear differential assembly 192 is also disposed forward of the muffler 86. The rear differential assembly 192 is operatively connected to the rear wheels 30 via rear wheel axle assemblies (not shown). The rear differential assembly 192 defines a rotation axis 192*a* (shown as a "+" sign in FIG. 10) of the rear wheel axle assemblies.

Referring to FIG. 10, an angle 200 is defined between transmission axis 130 and the cylinder axis 62. The angle 200 is of about 46 degrees, but other angles ranging between 40 to 50 degrees are also contemplated. Furthermore, an angle 202 is defined between the cylinder axis 62 and a driveline axis 204 which is an imaginary line passing through the rotation axes 176*a*, 192*a* and extending parallel to the longitudinal center plane 28. The angle 202 is of about 50 degrees, but other angles ranging between 40 and 60 degrees are also contemplated.

Figure 15:
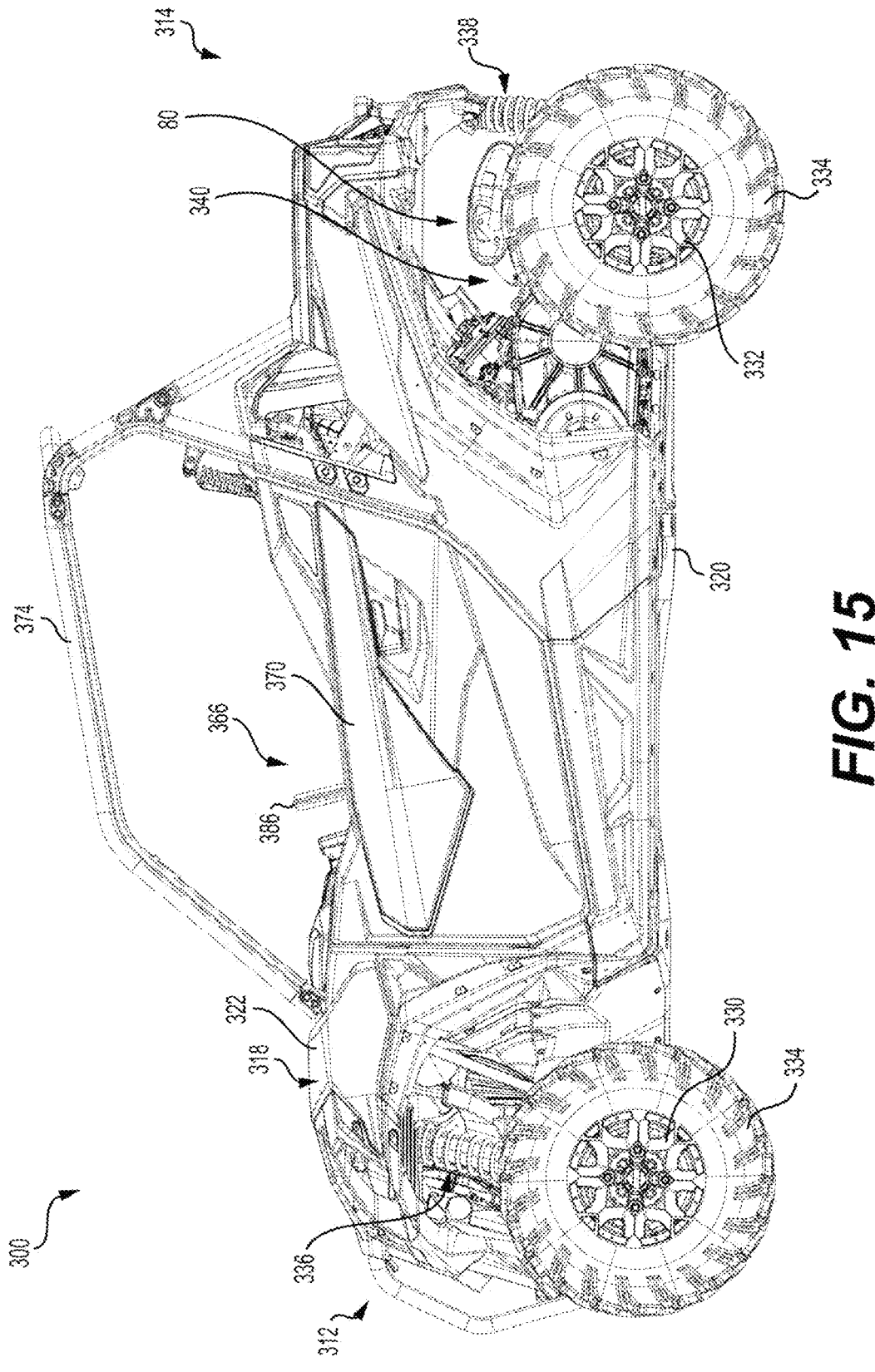
FIG. 15 is a left side elevation view of a side-by-side vehicle.
Figure 16:
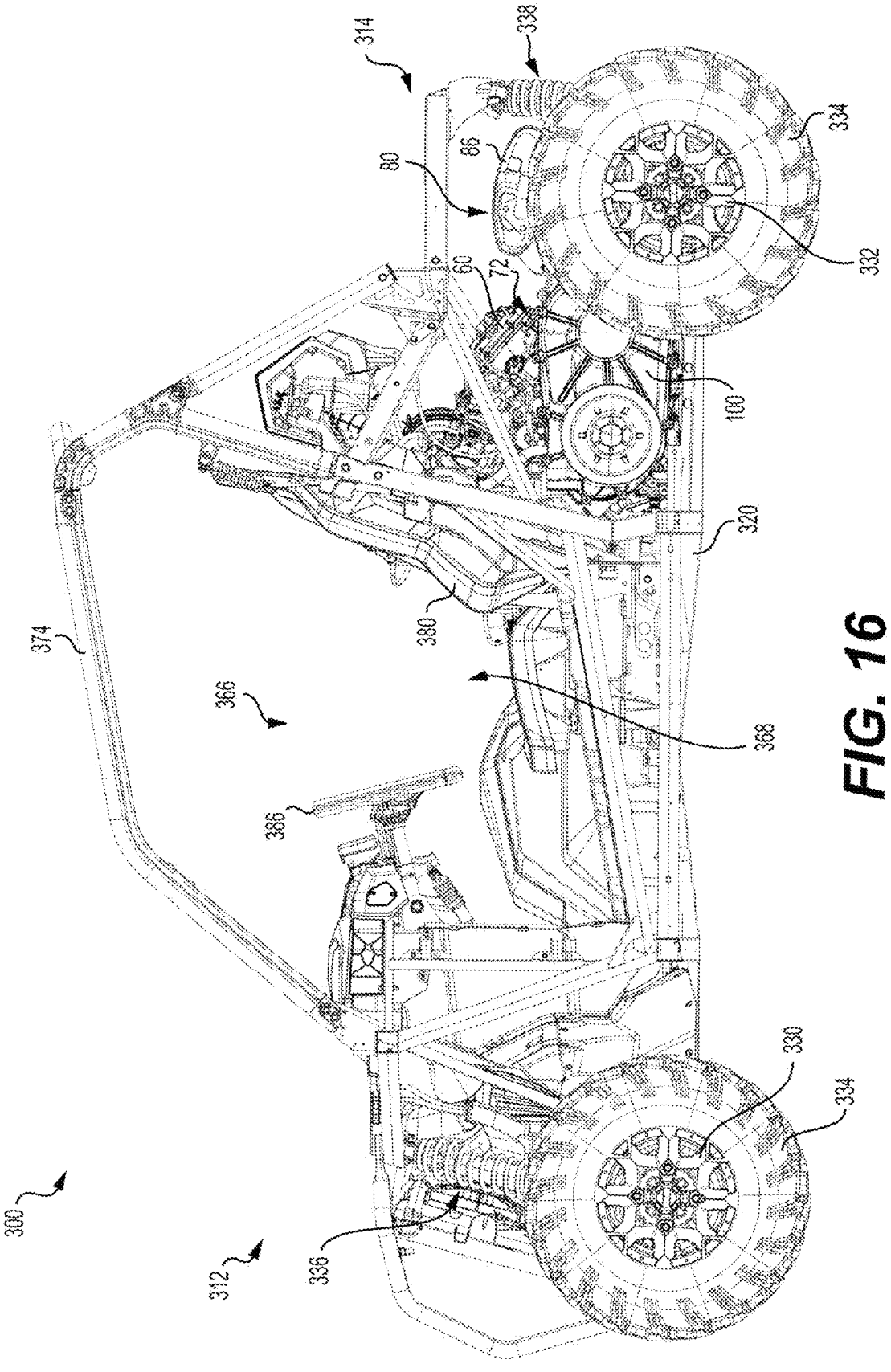
FIG. 16 is a left side elevation of the side-by-side vehicle of FIG. 15, with the body panels removed.
Figure 17:
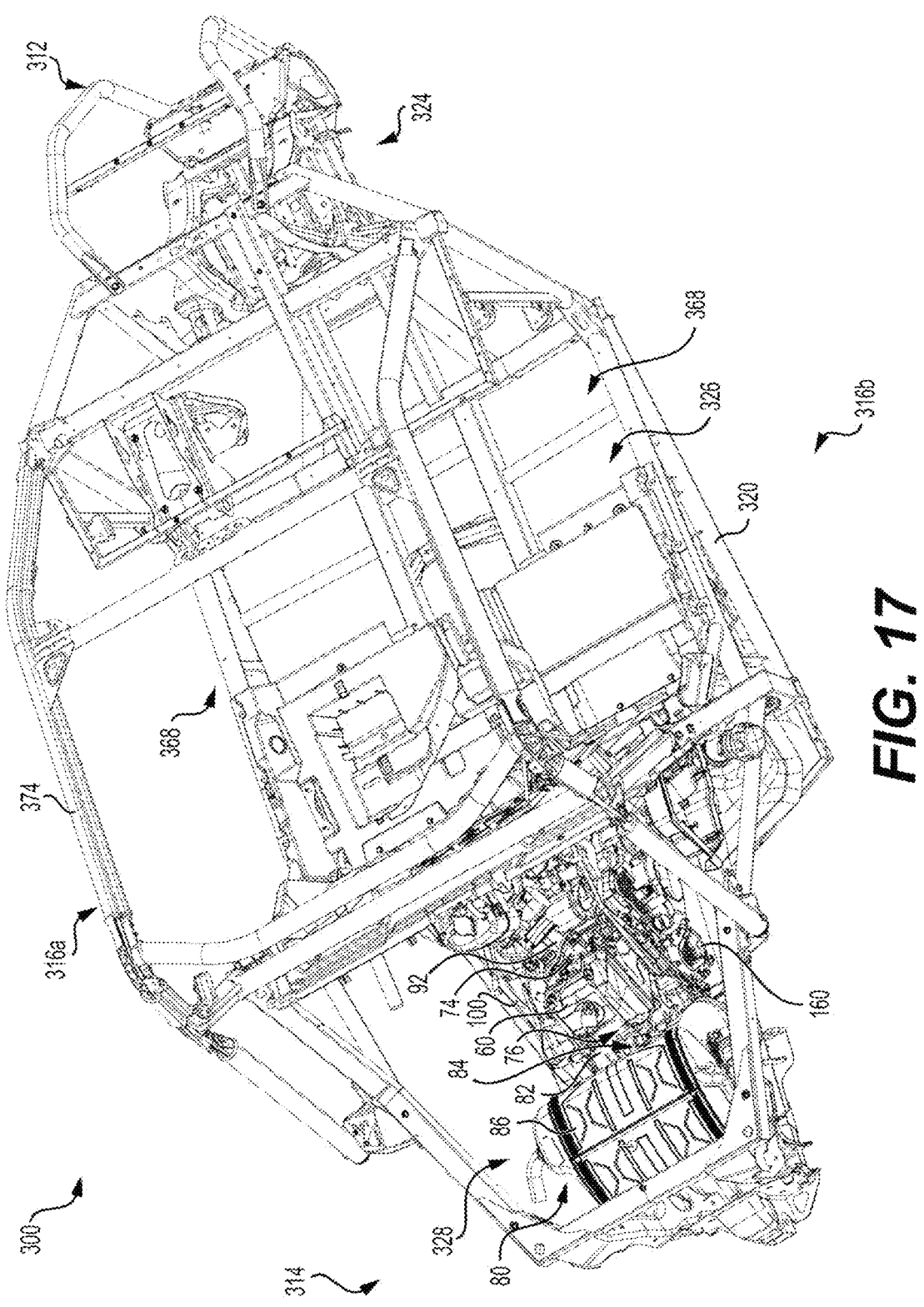
FIG. 17 is a perspective view taken from a top, rear, right side of a frame and powertrain of the side-by-side vehicle of FIG. 15.

Referring now to FIGS. 15 to 17, the side-by-side vehicle (SSV) 300 will be described briefly. The SSV 300 has a front end 312, a rear end 314, and left and right sides 316*a*, 316*b*, defined consistently with the forward travel direction of the vehicle 300. The vehicle 300 includes a vehicle body 318, to which the other parts of the vehicle 10 are connected. The vehicle body 318 includes a frame 320 and a plurality of body panels 322. The frame 320 has a front portion 324, a middle portion 326 and a rear portion 328 (FIG. 17).

The vehicle 300 includes a pair of front wheels 330 and a pair of rear wheels 332. Each one of the wheels 330, 332 has a tire 334. Each front wheel 330 is suspended from the front portion 324 of the frame 320 via a front suspension assembly 336. Each rear wheel 332 is suspended from the rear portion 328 of the frame 320 via a rear suspension assembly 338. Ground engaging members other than wheels 330, 332 are contemplated for the vehicle 300, such as tracks or skis. In addition, although four ground engaging members are illustrated in the Figures, the vehicle 300 could include more or less than four ground engaging members. Furthermore, different combinations of ground engaging members, such as tracks used in combination with skis, are contemplated.

The SSV 300 further includes a powertrain 340 including at least some of the components found in the ATV 10. Components being similar in both the ATV 10 and the SSV 300 will thus be described with the same reference numeral. The engine 60 is mounted to the rear portion 328 of the frame 320 of the SSV 300. The engine 60 is connected to the CVT 100, also mounted to the rear portion 328 of the frame of the SSV 300. The exhaust assembly 80 is connected to the frame 320. The exhaust assembly 80 includes the exhaust pipe 82 and the muffler 86. The forward portion 84 of the exhaust pipe 82 is connected to the exhaust port 76 of the engine 60. The exhaust port 76 is defined in the rear portion 72 of the engine 60. The exhaust pipe 82 extends from the engine 60 towards the rear end 314 of the SSV 300. Since the exhaust pipe 82 extends from the rear portion 72 of the engine 60 towards the rear end 314 of the SSV 300, the exhaust pipe 82 does not extend along the left or right side of the engine 60.

The SSV 300 has a cockpit area 366 disposed generally in the middle portion 326 of the frame 320. The cockpit area 366 has openings 368 on the left and right sides 316*a*, 316*b* of the vehicle 300 through which the riders can enter and exit the vehicle 300. Referring to FIG. 15, a lateral door 370 is disposed across each opening 368 (only a left lateral door 370 is being shown in FIG. 15). The lateral doors 370 are disposed across the openings 368 when the riders are riding the vehicle 300 and are opened by the driver and/or passenger when they desire to enter or exit the cockpit area 366. A roll cage 374, connected to the frame 320, is disposed over the cockpit area 366. The cockpit area 366 has a left seat 380 to accommodate a driver of the vehicle 300, and a right seat to accommodate two passengers (collectively referred to herein as riders). It is contemplated that the vehicle 300 could have one or more additional rows of seats. A steering assembly, including a steering wheel 386, is disposed in front of the left seat 380. The steering assembly is operatively connected to the two front wheels 330 to allow steering of the vehicle 300.

The all-terrain vehicle 20, the engine 60, and the exhaust assembly 80 implemented in accordance with some non-limiting implementations of the present technology can be represented as presented in the following numbered clauses.

CLAUSE 1: An all-terrain vehicle (20) comprising a frame (22) having a front end (24) and a rear end (26) defined consistently with a forward travel direction of the all-terrain vehicle, an internal combustion engine (60) connected to the frame, the engine including a front portion (70) and a rear portion (72), a single cylinder (61) defining a cylinder axis (62), an air intake port (74) defined in the front portion and facing towards the front end of the frame, and an exhaust port (76) defined in the rear portion facing towards the rear end of the frame, an exhaust assembly (80) fluidly connected to the exhaust port, the exhaust assembly extending from the engine towards the rear end of the frame, a continuously variable transmission (100) operatively connected to the engine, the continuously variable transmission including, a primary pulley (102) having a rotation axis (102*a*), the primary pulley being operatively connected to the engine, a secondary pulley (104) having a rotation axis (104*a*), a drive belt (110) looped around the primary and secondary pulleys, and a housing (120) enclosing the primary pulley, the secondary pulley, and the drive belt, the housing having a top end (122) and a bottom end (124), a straddle seat (40) connected to the frame, the engine being disposed under the straddle seat, a first footrest (42) disposed on a first side of a longitudinal center plane (28) of the all-terrain vehicle, and a second foot rest (42) disposed on the second side of the longitudinal center plane.

CLAUSE 2: The all-terrain vehicle of clause 1, wherein the cylinder axis is inclined towards the rear end of the frame by an angle comprised between 30 and 50 degrees relative to a first laterally extending vertical plane (66).

CLAUSE 3: The all-terrain vehicle of clause 1 or 2, wherein the cylinder axis passes through the straddle seat.

CLAUSE 4: The all-terrain vehicle of any one of clauses 1 to 3, further comprising an airbox assembly (90) connected to the frame and fluidly connected to the air intake port of the engine, at least a portion of the airbox assembly being disposed in front of the front portion of the engine.

CLAUSE 5: The all-terrain vehicle of clause 4, wherein the airbox assembly includes an airbox (92), and the airbox is disposed entirely longitudinally between the cylinder axis and the front end of the frame.

CLAUSE 6: The all-terrain vehicle of any one of clauses 1 to 5, wherein the exhaust assembly includes an exhaust pipe (82), and at least one portion of the exhaust pipe is disposed vertically between the top end and the bottom end of the housing of the continuously variable transmission.

CLAUSE 7: The all-terrain vehicle of clause 6, wherein at least one portion of the exhaust pipe extends within a circumference (116) of a cylindrical surface (118) defined by a perimeter (112*a*) of the secondary pulley.

CLAUSE 8: The all-terrain vehicle of any one of clauses 1 to 7, wherein the exhaust assembly further includes a muffler (86), and the muffler is disposed vertically between the cylinder axis and a transmission axis (130), the transmission axis passing through the rotation axis of the primary pulley and the rotation axis of the secondary pulley.

CLAUSE 9: The all-terrain vehicle of clause 8, wherein the transmission axis is angularly displaced from the cylinder axis by an angle comprised between 40 and 50 degrees.

CLAUSE 10: The all-terrain vehicle of any one of clauses 1 to 9, further comprising a driveline (170) operatively connected to the secondary pulley, the driveline including a drive shaft (172) operatively connected to the engine via the continuously variable transmission, a front propeller shaft (174) operatively connected to the drive shaft and extending towards the front end of the frame, and a rear propeller shaft (190) operatively connected to the drive shaft and extending towards the rear end of the frame.

CLAUSE 11: The all-terrain vehicle of clause 10, wherein the driveline further includes a front differential assembly operatively connected to the front propeller shaft, the front differential assembly (176) having a rotation axis (176*a*), a rear differential assembly (192) operatively connected to the rear propeller shaft, the rear differential assembly having a rotation axis (192*a*), a driveline axis (204) passing through the rotation axis of the front differential assembly and the rotation axis of the rear differential assembly, and wherein the driveline axis is angularly displaced from the cylinder axis by an angle comprised between 40 to 60 degrees.

CLAUSE 12: The all-terrain vehicle of clause 10 or 11, further comprising a subtransmission (160) operatively connecting the secondary pulley to the drive shaft.

CLAUSE 13: The all-terrain vehicle of any one of clauses 10 to 12, wherein a second laterally extending vertical plane (67) containing the rotation axis of the secondary pulley intersects the exhaust port of the engine.

CLAUSE 14: The all-terrain vehicle of any one of clauses 1 to 13, wherein a portion of the exhaust port is below a horizontal plane (140) passing through a top end (112*b*) of the secondary pulley.

CLAUSE 15: The all-terrain vehicle of any one of clauses 1 to 14, wherein the first and second footrests are connected to the frame.

CLAUSE 16: The all-terrain vehicle of any one of clauses 1 to 15, further comprising a fuel tank (88) supported by the frame, and the fuel tank is disposed entirely behind the rear portion of the engine.

CLAUSE 17: The all-terrain vehicle of any one of clauses 1 to 16, wherein the continuously variable transmission further includes an air inlet pipe (150) connected to the housing, the air inlet pipe defining an air intake (154) disposed forward of the housing and the engine.

CLAUSE 18: The all-terrain vehicle of any one of clauses 1 to 17, wherein the continuously variable transmission further includes an air outlet pipe (152) connected to the housing, the air outlet pipe defining an air outlet (156) disposed forward of the housing and the engine.

CLAUSE 19: The all-terrain vehicle of any one of clauses 1 to 18, further comprising a plurality of wheels (30), at least one of the wheels being operatively connected to the internal combustion engine and continuously variable transmission for propelling the all-terrain vehicle, and a steering assembly (44) supported by the frame and operatively connected to at least one of the plurality of wheels to steer the all-terrain vehicle.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An all-terrain vehicle comprising:

a frame having a front end and a rear end defined consistently with a forward travel direction of the all-terrain vehicle;

an internal combustion engine connected to the frame, the internal combustion engine including:

a front portion and a rear portion;

a single cylinder defining a cylinder axis, the cylinder axis being inclined towards the rear end of the frame;

an air intake port defined by the single cylinder, in the front portion and facing towards the front end of the frame; and an exhaust port defined by the single cylinder, in the rear portion and facing towards the rear end of the frame;

an exhaust assembly fluidly connected to the exhaust port, the exhaust assembly extending from the internal combustion engine towards the rear end of the frame;

a continuously variable transmission operatively connected to the internal combustion engine, the continuously variable transmission including:

a primary pulley having a rotation axis, the primary pulley being operatively connected to and driven by the internal combustion engine, the cylinder axis intersecting the rotation axis of the primary pulley;

a secondary pulley having a rotation axis, the secondary pulley being disposed rearward of the primary pulley;

a drive belt looped around the primary and secondary pulleys, the secondary pulley being driven by the primary pulley via the drive belt, a transmission axis being angularly displaced from the cylinder axis by an angle comprised between 40 and 50 degrees, the transmission axis passing through the rotation axis of the primary pulley and the rotation axis of the secondary pulley, the angle being above the transmission axis and on a same side of the cylinder axis as the rotation axis of the secondary pulley; and a housing enclosing the primary pulley, the secondary pulley, and the drive belt, the housing having a top end and a bottom end;

a straddle seat connected to the frame, the internal combustion engine being disposed under the straddle seat;

a first footrest disposed on a first side of a longitudinal center plane of the all-terrain vehicle; and a second footrest disposed on a second side of the longitudinal center plane.

2. The all-terrain vehicle of claim 1, wherein the cylinder axis is inclined towards the rear end of the frame by another angle comprised between 30 and 50 degrees relative to a first laterally extending vertical plane.

3. The all-terrain vehicle of claim 1, wherein the cylinder axis passes through the straddle seat.

4. The all-terrain vehicle of claim 1, further comprising an airbox assembly connected to the frame and fluidly connected to the air intake port of the internal combustion engine, at least a portion of the airbox assembly being disposed in front of the front portion of the internal combustion engine.

5. The all-terrain vehicle of claim 4, wherein the airbox assembly includes an airbox, and the airbox is disposed entirely longitudinally between the cylinder axis and the front end of the frame.

6. The all-terrain vehicle of claim 1, wherein the exhaust assembly includes an exhaust pipe, and at least one portion of the exhaust pipe is disposed vertically between the top end and the bottom end of the housing of the continuously variable transmission.

7. The all-terrain vehicle of claim 1, wherein the exhaust assembly further includes a muffler, and the muffler is disposed vertically between the cylinder axis and the transmission axis.

8. The all-terrain vehicle of claim 7, wherein the angle is 46 degrees.

9. The all-terrain vehicle of claim 1, further comprising a driveline operatively connected to the secondary pulley, the driveline including:

a drive shaft operatively connected to the internal combustion engine via the continuously variable transmission;

a front propeller shaft operatively connected to the drive shaft and extending towards the front end of the frame; and a rear propeller shaft operatively connected to the drive shaft and extending towards the rear end of the frame.

10. The all-terrain vehicle of claim 9, wherein the driveline further includes:

a front differential assembly operatively connected to the front propeller shaft, the front differential assembly having a rotation axis;

a rear differential assembly operatively connected to the rear propeller shaft, the rear differential assembly having a rotation axis;

a driveline axis passing through the rotation axis of the front differential assembly and the rotation axis of the rear differential assembly; and wherein the driveline axis is angularly displaced from the cylinder axis by another angle comprised between 40 to 60 degrees.

11. The all-terrain vehicle of claim 9, further comprising a subtransmission operatively connecting the secondary pulley to the drive shaft.

12. The all-terrain vehicle of claim 11, wherein:

the internal combustion engine further includes a crankshaft; and the subtransmission is disposed rearward of the crankshaft.

13. The all-terrain vehicle of claim 9, wherein a second laterally extending vertical plane containing the rotation axis of the secondary pulley intersects the exhaust port of the internal combustion engine.

14. The all-terrain vehicle of claim 1, wherein the first and second footrests are connected to the frame.

15. The all-terrain vehicle of claim 1, further comprising a fuel tank supported by the frame, and the fuel tank is disposed entirely behind the rear portion of the internal combustion engine.

16. The all-terrain vehicle of claim 1, wherein the continuously variable transmission further includes an air inlet pipe connected to the housing, the air inlet pipe defining an air intake disposed forward of the housing and the internal combustion engine.

17. The all-terrain vehicle of claim 1, wherein the continuously variable transmission further includes an air outlet pipe connected to the housing, the air outlet pipe defining an air outlet disposed forward of the housing and the internal combustion engine.

18. The all-terrain vehicle of claim 1, further comprising a plurality of wheels, at least one of the wheels being operatively connected to the internal combustion engine and continuously variable transmission for propelling the all-terrain vehicle, and a steering assembly supported by the frame and operatively connected to at least one of the plurality of wheels to steer the all-terrain vehicle.

19. An all-terrain vehicle comprising:

a frame having a front end and a rear end defined consistently with a forward travel direction of the all-terrain vehicle;

an internal combustion engine connected to the frame, the internal combustion engine including:

a front portion and a rear portion;

a single cylinder defining a cylinder axis;

an air intake port defined by the single cylinder, in the front portion and facing towards the front end of the frame; and an exhaust port defined by the single cylinder, in the rear portion and facing towards the rear end of the frame;

an exhaust assembly fluidly connected to the exhaust port, the exhaust assembly extending from the internal combustion engine towards the rear end of the frame;

a continuously variable transmission operatively connected to the internal combustion engine, the continuously variable transmission including:

a primary pulley having a rotation axis, the primary pulley being operatively connected to the internal combustion engine;

a secondary pulley having a rotation axis, the secondary pulley being disposed rearward of the primary pulley;

a drive belt looped around the primary and secondary pulleys; and a housing enclosing the primary pulley, the secondary pulley, and the drive belt, the housing having a top end and a bottom end;

a straddle seat connected to the frame, the internal combustion engine being disposed under the straddle seat;

a first footrest disposed on a first side of a longitudinal center plane of the all-terrain vehicle; and a second footrest disposed on a second side of the longitudinal center plane;

the exhaust assembly including an exhaust pipe, at least one portion of the exhaust pipe being disposed vertically between the top end and the bottom end of the housing of the continuously variable transmission, and at least one portion of the exhaust pipe extending within a circumference of a cylindrical surface defined by a perimeter of the secondary pulley.

20. An all-terrain vehicle comprising:

a frame having a front end and a rear end defined consistently with a forward travel direction of the all-terrain vehicle;

an internal combustion engine connected to the frame, the internal combustion engine including:

a front portion and a rear portion;

a single cylinder defining a cylinder axis;

an air intake port defined by the single cylinder, in the front portion and facing towards the front end of the frame; and an exhaust port defined by the single cylinder, in the rear portion and facing towards the rear end of the frame;

an exhaust assembly fluidly connected to the exhaust port, the exhaust assembly extending from the internal combustion engine towards the rear end of the frame;

a continuously variable transmission operatively connected to the internal combustion engine, the continuously variable transmission including:

a primary pulley having a rotation axis, the primary pulley being operatively connected to the internal combustion engine;

a secondary pulley having a rotation axis, the secondary pulley being disposed rearward of the primary pulley;

a drive belt looped around the primary and secondary pulleys; and a housing enclosing the primary pulley, the secondary pulley, and the drive belt, the housing having a top end and a bottom end;

a straddle seat connected to the frame, the internal combustion engine being disposed under the straddle seat;

a first footrest disposed on a first side of a longitudinal center plane of the all-terrain vehicle;

a second footrest disposed on a second side of the longitudinal center plane; and a portion of the exhaust port being below a horizontal plane passing through a top end of the secondary pulley.

\* \* \* \* \*